(12) United States Patent
Fattahi et al.

(10) Patent No.: US 9,782,023 B2
(45) Date of Patent: Oct. 10, 2017

(54) WALL HANGING APPARATUS, SYSTEM, AND METHOD

(71) Applicants: Marc Fattahi, Norwalk, CT (US); Carl Ferraro, Norwalk, CT (US)

(72) Inventors: Marc Fattahi, Norwalk, CT (US); Carl Ferraro, Norwalk, CT (US)

( * ) Notice: Subject to any disclaimer, the term of this patent is extended or adjusted under 35 U.S.C. 154(b) by 0 days.

(21) Appl. No.: 15/426,482

(22) Filed: Feb. 7, 2017

(65) Prior Publication Data

US 2017/0202375 A1    Jul. 20, 2017

Related U.S. Application Data

(63) Continuation-in-part of application No. 14/852,275, filed on Sep. 11, 2015.

(51) Int. Cl.
*A47G 1/16* (2006.01)
*A47G 1/17* (2006.01)
*F16M 13/02* (2006.01)

(52) U.S. Cl.
CPC ............. *A47G 1/17* (2013.01); *A47G 1/1606* (2013.01); *F16M 13/02* (2013.01)

(58) Field of Classification Search
CPC ......... A47G 1/17; A47G 1/1606; F16M 13/02
USPC ............. 248/475.1, 476, 488, 489, 490, 495
See application file for complete search history.

(56) References Cited

U.S. PATENT DOCUMENTS

| | | | |
|---|---|---|---|
| 3,155,358 A * | 11/1964 | Carlson | A47B 95/008 248/231.71 |
| 3,861,639 A * | 1/1975 | Morrill | A47G 1/1606 248/489 |
| 5,961,090 A * | 10/1999 | Parkin | A47G 1/1606 248/475.1 |
| 7,484,311 B2 | 2/2009 | Bommarito | |
| 7,770,865 B2 | 8/2010 | Shaffer | |
| 7,802,769 B1 * | 9/2010 | Lindsey | A47G 1/205 248/475.1 |

(Continued)

OTHER PUBLICATIONS

Level-lock system, web address https://www.diplomaframe.com/Portals/0/images/Content/Product%20Info/Level-Lock/Hanging%20Your%20Framing%20Using%20Level-Lock.pdf.

*Primary Examiner* — Gwendolyn Baxter
(74) *Attorney, Agent, or Firm* — Michael A. Blake

(57) ABSTRACT

A wall hanging apparatus relates to a wall hanging system having a frame configured to display an item. The wall hanging comprises an upper half. The upper half comprises a frame attachment portion. An extended member extends down from the frame attachment portion. At least one screw hole is located in the frame attachment portion and configured to allow a screw to attach the upper half to the frame. A first set screw groove is located in a first side of the extended member. A lower half comprises an adhesive sheet on the lower half. The adhesive sheet is configured to cause the lower half to adhere to the wall when the lower half is pressed against the wall. A receiving slot is configured to receive the extended member. At least one screw hole is located in the lower half and configured to allow the screw to attach the lower half to the wall. A first set screw hole is located on a first outer side of the lower half. The first set screw hole is configured to allow a set screw to screw into the first set screw hole and impinge on the first set screw groove and generally prevent the upper half from sliding out of the lower half when the set screw is screwed into the first set screw groove.

12 Claims, 24 Drawing Sheets

(56) References Cited

U.S. PATENT DOCUMENTS

| | | |
|---|---|---|
| 8,209,836 B2 | 7/2012 | Klein |
| 8,740,171 B2 | 6/2014 | Crescenzo |
| 8,898,945 B2 | 12/2014 | Miller |
| 9,609,964 B1* | 4/2017 | Munson ................ A47G 1/1606 |
| 2003/0038222 A1* | 2/2003 | Holmes ................ A47G 1/1606 |
| | | 248/475.1 |
| 2009/0294610 A1* | 12/2009 | Paharik ................ A47G 1/1606 |
| | | 248/220.21 |

* cited by examiner

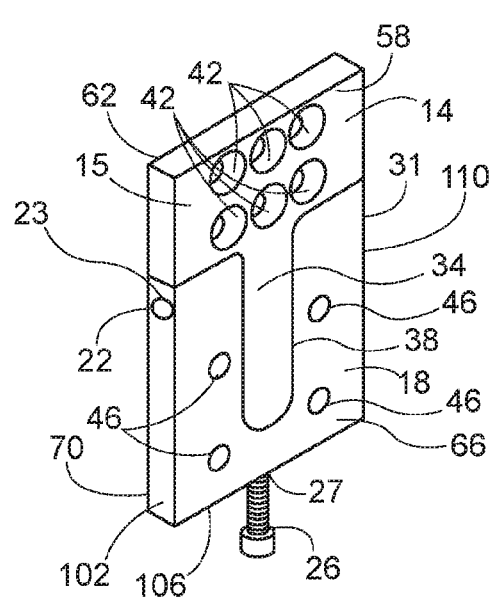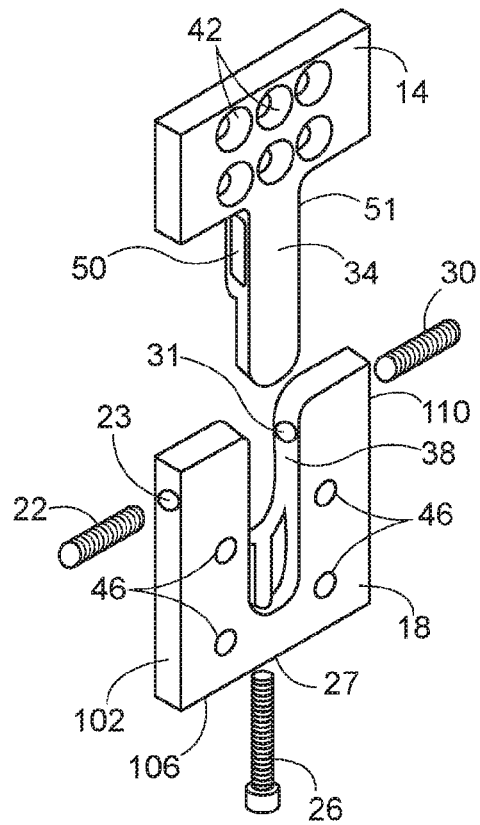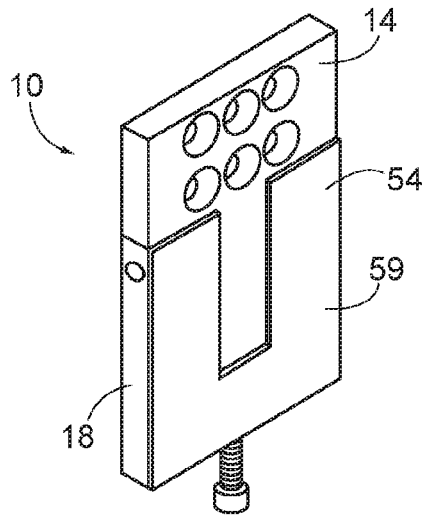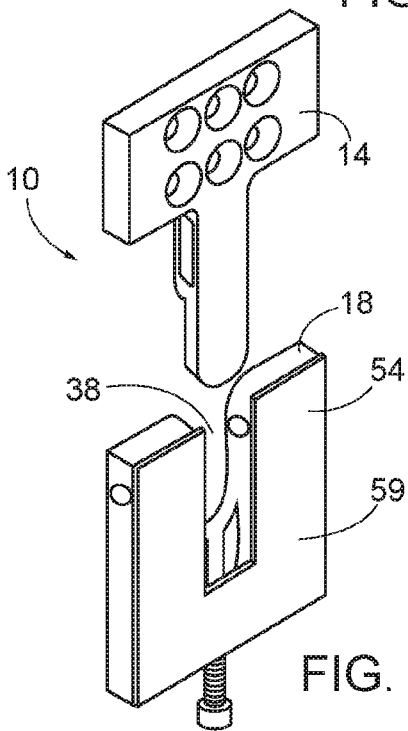

WALL HANGING APPARATUS, SYSTEM, AND METHOD

CROSS-REFERENCES

This patent application is a continuation-in-part of patent application Ser. No. 14/852,275, by Marc Fattahi, entitled "WALL HANGING SYSTEM USING MULTIPLE DEVICES", filed on Sep. 11, 2015, the entire contents of which are fully incorporated by reference herein.

TECHNICAL FIELD

The invention relates to a wall hanging apparatus for the hanging of objects on a wall or other surface, and, more particularly, to a wall hanging apparatus that does not require the use of nails.

BACKGROUND

Currently when hanging frames there are problems precisely locating where the frame will hang on the wall, problems with precisely aligning the frame vertically and horizontally, problems securing the frame to the wall so that it cannot be dislodged or misaligned unintentionally, and problems securing the frame to the wall so it that cannot be removed easily by a person who does not have a right to remove it.

Current know solutions include nailing a nail into a wall, and hanging a picture from the nail. Such a solution can lead to crookedly hung pictures, and pictures or other objects that can be easily removed and/or stolen.

Thus there is a need for a wall hanging apparatus and method that overcomes the above listed and other disadvantages.

SUMMARY OF THE INVENTION

The disclosed invention relates to a wall hanging apparatus comprising: an upper half; the upper half comprising: a frame attachment portion; an extended member extending down from the frame attachment portion; at least one screw hole located in the frame attachment portion and configured to allow a screw to attach the upper half to a frame; a first set screw groove located in a first side of the extended member; a lower half, the lower comprising: an adhesive sheet on the lower half, the adhesive sheet configured to cause the lower half to adhere to a wall when the lower half is pressed against a wall; a receiving slot configured to receive the extended member; at least one screw hole located in the lower half and configured to allow a screw to attach the lower half to a wall; a first set screw hole located on a first outer side of the lower half, the first set screw hole configured to allow a set screw to screw into the first set screw hole and impinge on the first set screw groove and generally prevent the upper half from sliding out of the lower half when a set screw is screwed into the first set screw groove.

The invention also relates to a wall hanging system comprising: a frame configured to display an item; a first upper half configured to attach to a rear surface of the frame, the first upper half comprising: a frame attachment portion; an extended member extending down from the frame attachment portion; at least one screw hole located in the frame attachment portion and configured to allow a screw to attach the first upper half to the frame; a first set screw groove located in a first side of the extended member; a wall; a first lower half configured to attach to the wall, the lower comprising: an adhesive sheet on the first lower half, the adhesive sheet configured to adhere to a wall when the first lower half is pressed against a wall; a receiving slot configured to receive the extended member; at least one screw hole located in the lower half and configured to allow a screw to attach the second lower half to the wall; a first set screw hole located on a first outer side of the second lower half, the first set screw hole configured to allow a set screw to screw into the first set screw hole and impinge on the first set screw groove and generally prevent the second upper half from sliding out of the second lower half when a set screw is screwed into the first set screw groove.

In addition, the disclosed invention relates to a method of hanging a frame on a wall, the method comprising: attaching an upper half to a lower half; attaching the upper half to a rear of a frame; removing adhesive backing from the lower half; placing rear of frame on wall where desired; pressing rear of frame against the wall so the lower half adheres to wall; sliding frame up with respect to lower half so upper half slides out from lower half, and lower half remains adhered to wall; fastening with fasteners the lower half to wall at location where lower half is adhered to wall; sliding frame back onto lower half; adjusting location of frame via set screw in the bottom side of the lower half, and locking the upper half to the lower half via a set screw in the first outer side of the lower half and via a set screw in second outer side of the lower half.

The disclosed invention also relates to a wall hanging system comprising: a frame configured to display an item, the frame comprising a groove on the rear side of the frame; a first upper half configured to attach to a rear surface of the frame, the first upper half comprising: a frame attachment portion; a groove attachment member attached to the frame attachment portion; an extended member extending down from the frame attachment portion; at least one screw hole located in the frame attachment portion and configured to allow a screw to attach the first upper half to the frame; a first set screw groove located in a first side of the extended member; a wall; a first lower half configured to attach to the wall, the lower comprising: an adhesive sheet on the first lower half, the adhesive sheet configured to adhere to a wall when the first lower half is pressed against a wall; a receiving slot configured to receive the extended member; at least one screw hole located in the lower half and configured to allow a screw to attach the second lower half to the wall; a first set screw hole located on a first outer side of the second lower half, the first set screw hole configured to allow a set screw to screw into the first set screw hole and impinge on the first set screw groove and generally prevent the second upper half from sliding out of the second lower half when a set screw is screwed into the first set screw groove; a bottom frame upper half, the upper half comprising: a frame attachment portion; a groove attachment member attached to one side of the frame attachment portion, the groove attachment member configured to attach to the groove; an extended member extending down from the frame attachment portion; a first set screw groove located in a first side of the extended member; a bottom frame lower half, the lower comprising: an adhesive sheet on the lower half, the adhesive sheet configured to cause the lower half to adhere to a wall when the lower half is pressed against a wall; a receiving slot configured to receive the extended member; at least one screw hole located in the lower half and configured to allow a screw to attach the bottom frame lower half to a wall; and a first set screw hole located on a first outer side of bottom frame the lower half, the first set screw hole configured to allow a set screw to screw into the first set screw hole and impinge on the first set screw groove and generally prevent the bottom frame upper half from sliding out of the bottom frame lower half when a set screw is screwed into the first set screw groove.

BRIEF DESCRIPTION OF THE DRAWINGS

The present disclosure will be better understood by those skilled in the pertinent art by referencing the accompanying drawings, where like elements are numbered alike in the several figures, in which:

FIG. 1 is a perspective view of the wall hanging apparatus;

FIG. 2 is a perspective view of the wall hanging apparatus from FIG. 1, with the upper half separated from the lower half;

FIG. 3 is a is a perspective view of the wall hanging apparatus with a sheet of adhesive attached to the lower half;

FIG. 4 is a perspective view of the wall hanging apparatus from FIG. 3, with the upper half separated from the lower half;

DETAILED DESCRIPTION

Figure 5:
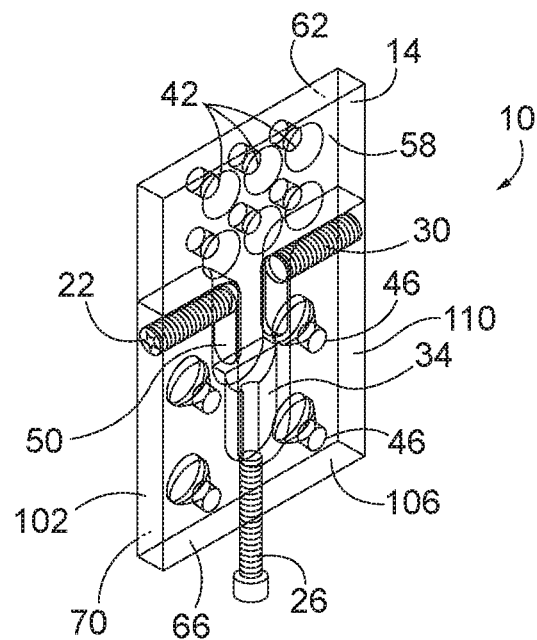
FIG. 5 is a perspective view of the wall hanging apparatus from FIG. 1, but with the upper and lower halves shown as being transparent.

The disclosed wall hanging apparatus allows for the level installation of a frame or other object on a precise location on a wall or other vertical or non-vertical surface (all of which will hereafter be referred to as "wall"). This may be accomplished by using two pieces with one piece attached to each side of a frame. Each piece may have two halves: an upper half which is attached to a frame by screws or other fasteners (all of which will hereafter be referred to as "screw" or "screws") and a lower half that may be initially attached to a wall by an adhesive and then secured permanently to a wall by screws. Once the frame is installed on the wall the pieces may be minutely adjusted by an installer to compensate for any minor error in installation as to height or horizontal alignment. Set screws and/or grooves may be used to secure the upper half of a piece to the lower half of the piece and thereby fastens a frame to a wall in a manner that prevents accidental dislodging or mis-aligning of that frame by accident and prevents the unauthorized removal of that frame.

FIG. 1 shows one embodiment of the disclosed wall hanging apparatus 10. The apparatus comprises an upper half 14, and a lower half 18. The lower half may have a first set screw hole 23 located on a first outer side 102 of the lower half 18, and a second set screw hole 27 located on a bottom side 106 of the lower half 18, and a third set screw hole 31 located on a second outer side 110 of the lower half 18 (visible in FIG. 2). A first set screw 22 is configured to screw into the first set screw hole 23. A second set screw 26 is configured to screw into the second set screw hole 27. A third set screw 30 is configured to screw into the third set screw hole 31. The upper half comprises an extended member 34 extending down from the frame attachment portion 15. The lower half comprises a receiving slot 38. The upper half may comprise a wall side 58 and a frame side 62. The lower half 18 may comprise a wall side 66 and a frame side 70. The upper half 14 comprises screw holes 42, and the lower half comprises screw holes 46. The screw holes 42 may be configured to receive screws that will attach the upper half to a frame or other object to be attached to a wall or other surface. Thus the screw holes 42 may be countersunk on the wall side 58. The screw holes 46 may be configured to receive screws that will attach the lower half to a wall, or other surface. Thus the screw holes 46 may be countersunk on the frame side 70.

FIG. 2 shows the upper half 14 and lower half 18 separate from each other, and the set screws 22, 26, 30 unscrewed from their respective screw holes 23, 27, 31. In this view the extended member 34 is shown with a first set screw groove 50 located neither on wall side 58 nor frame side 62, but on a first side 63. The first set screw groove 50 is configured to receive the set screw 22. When the set screw 22 is screwed into the set screw groove 50, the upper half 14 is prevented from being separated from the lower half 18. There may be a second set screw groove 51 on the opposite side of the extended member 34, the second side 64 of the extending member, configured to receive the set screw 30.

FIG. 3 shows the wall hanging apparatus 10 with an adhesive sheet 54 attached generally to the lower half 18. The adhesive sheet 54 may have a removable backing 59. The adhesive sheet 54 may slightly overlap onto the upper half 14. FIG. 4 shows the wall hanging apparatus 10 of FIG. 3 with the upper half 14 removed from the lower half 18. Although the adhesive sheet 54 may overlap onto the upper half, there is no enough overlap to prevent the upper half 14 from being removed from the lower half 18.

Figure 6:
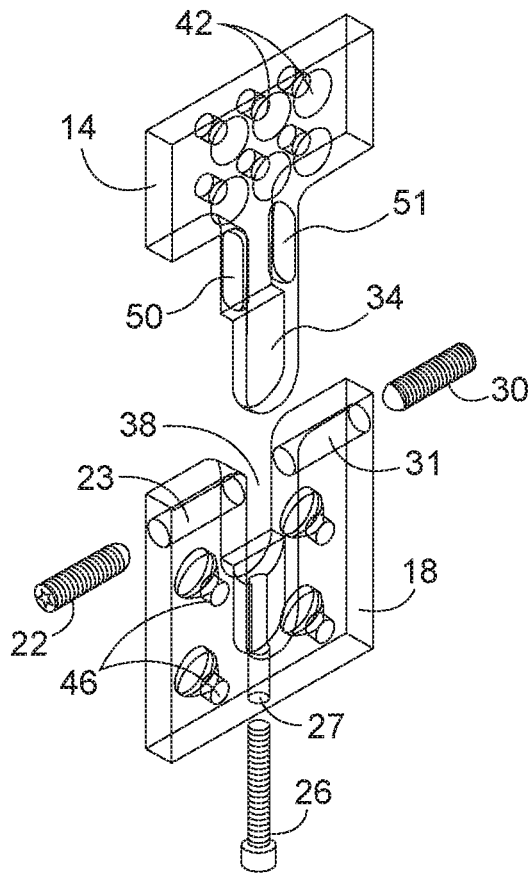
FIG. 6 is a perspective view of the wall hanging apparatus from FIG. 5, with the upper half separated from the lower half.

FIG. 5 shows the wall hanging apparatus 10 of FIG. 1, but with the upper half 14 and lower half 18 transparent for simplicity. FIG. 6 shows the wall hanging apparatus 10 of FIG. 2, but with the upper half 14 and lower half 18 transparent for simplicity.

Figure 7:
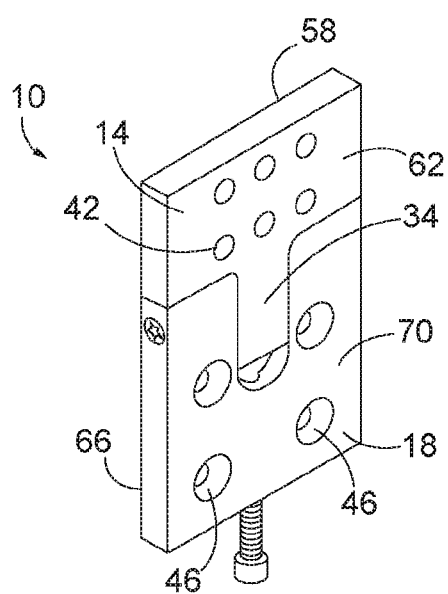
FIG. 7 is a perspective rear view of the wall hanging apparatus from FIG. 1.
Figure 8:
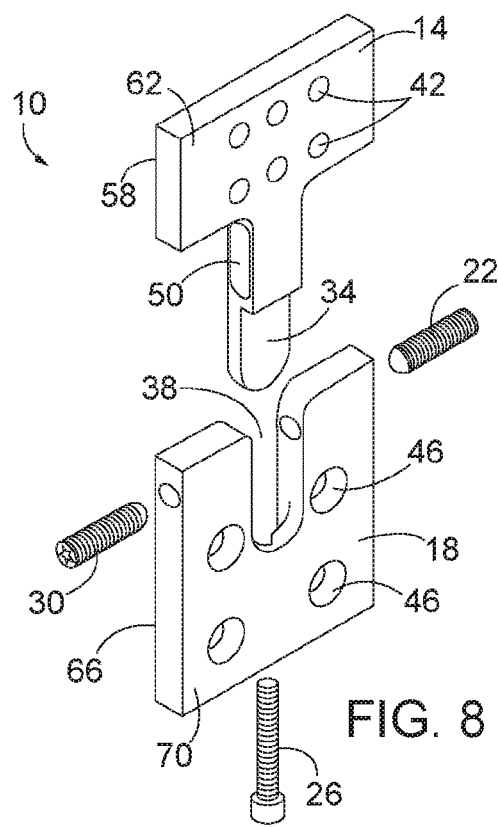
FIG. 8 is a perspective view of the wall hanging apparatus from FIG. 7, with the upper half separated from the lower half.

FIG. 7 shows a rear view of the wall hanging apparatus 10 of FIG. 1. In this view, the countersunk screw holes 46 are clearly visible on the lower half frame side 70. Screw holes 42 are not countersunk on the frame side 62. FIG. 8 shows the wall hanging apparatus 10 of FIG. 7, but with the upper half 14 separated from the lower half 18.

Figure 9:
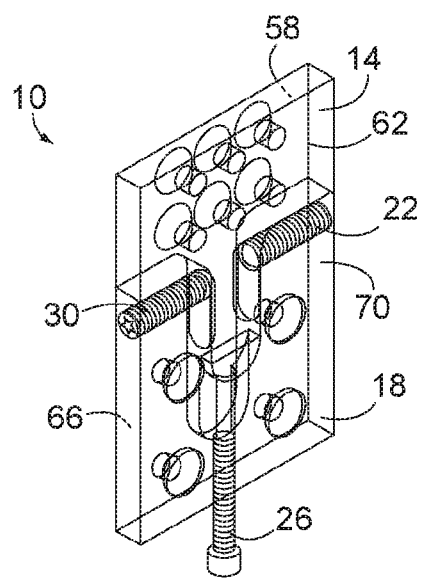
FIG. 9 is a perspective view of the wall hanging apparatus from FIG. 7, but with the upper and lower halves shown as being transparent.
Figure 10:
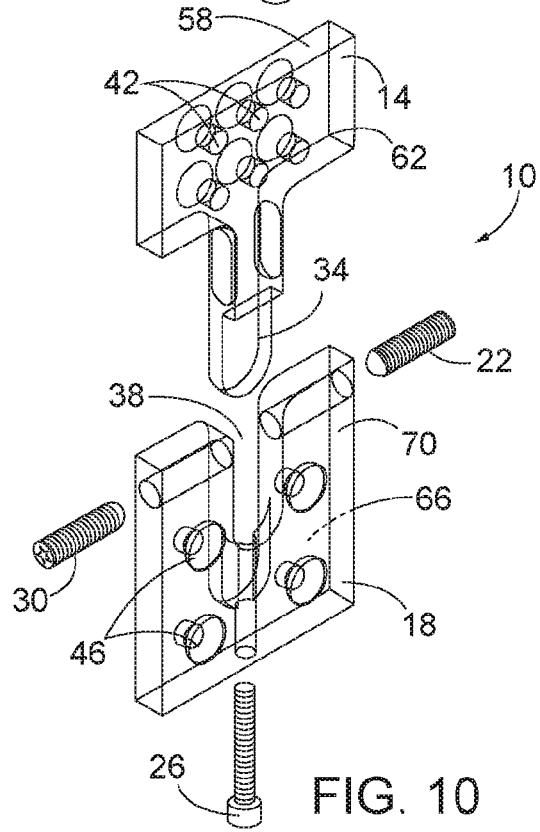
FIG. 10 is a perspective view of the wall hanging apparatus from FIG. 8, but with the upper and lower halves shown as being transparent.

FIG. 9 shows the wall hanging apparatus 10 of FIG. 7, but with the upper half 14 and lower half 18 transparent for simplicity. FIG. 10 shows the wall hanging apparatus 10 of FIG. 8, but with the upper half 14 and lower half 18 transparent for simplicity.

Figure 11:
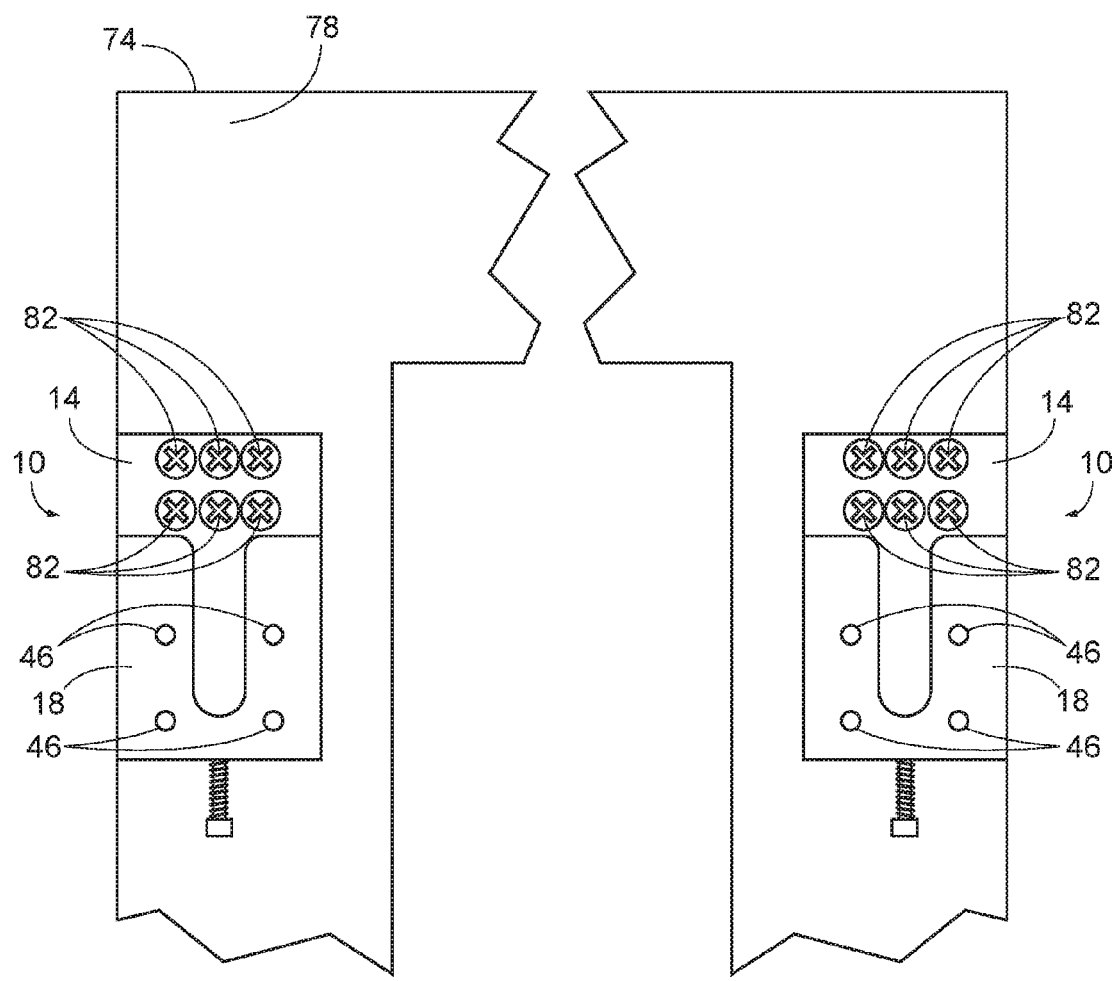
FIG. 11 is a rear view of a frame with the wall hanging apparatus attached to the frame.

FIG. 11, shows one method of using the wall hanging apparatus 10. In this first step, two apparatuses 10 are shown attached to the rear 78 of a frame 74. The upper half 14 of both apparatuses 10 are shown attached to the frame 74 by having screws 82 screwed through the upper halves 14 into the rear 78 of the frame 74. The screw holes 46 in the lower 18 do not have screws in them yet.

Figure 12:
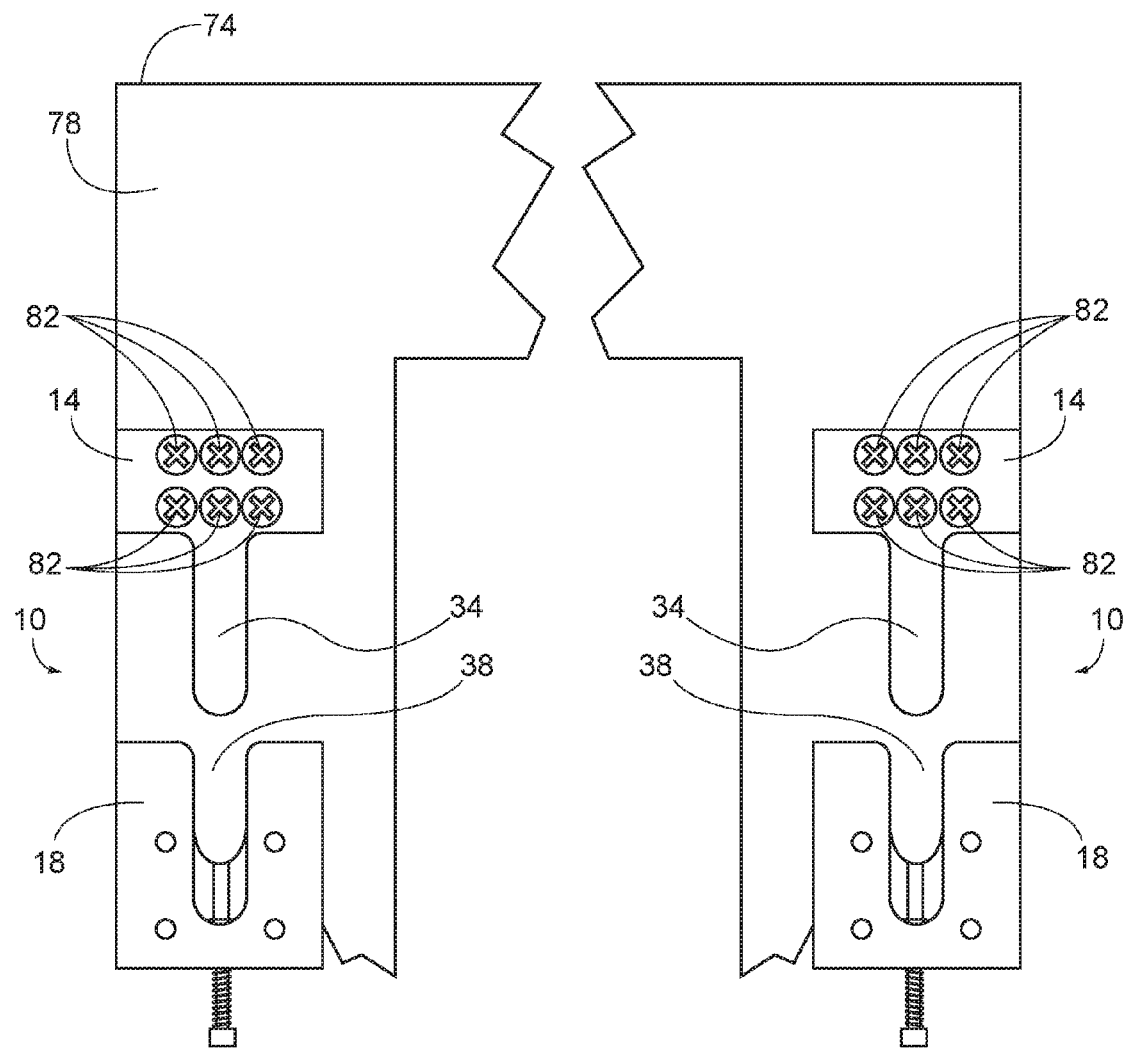
FIG. 12 is a rear view of a frame with the upper halves attached to the frame, and the upper halves separated from the lower halves.

FIG. 12 shows the next step, where the rear 78 of the frame 74, with the apparatuses attached to the rear of the frame via screws 82, is pressed against a wall, or other surface. The adhesive sheet 54 generally on the lower halves 18 will cause the lower halves to stick to the wall. The adhesive sheet 54 is not shown in FIGS. 11 and 12. Next, the frame can be lifted away from the lower half such that the extended member 34 slides out of the receiving slot 38. Now the lower halves 18 are adhered to the wall via the adhesive sheets 54. At this point, a user can simply use the lower halves 18 screw holes 46 to locate where to screw in the screws for the lower halves 18 on the wall. Then the user can set the frame back on the wall by sliding the frame and the upper halves 14 back onto the lower halves 18.

Figure 13:
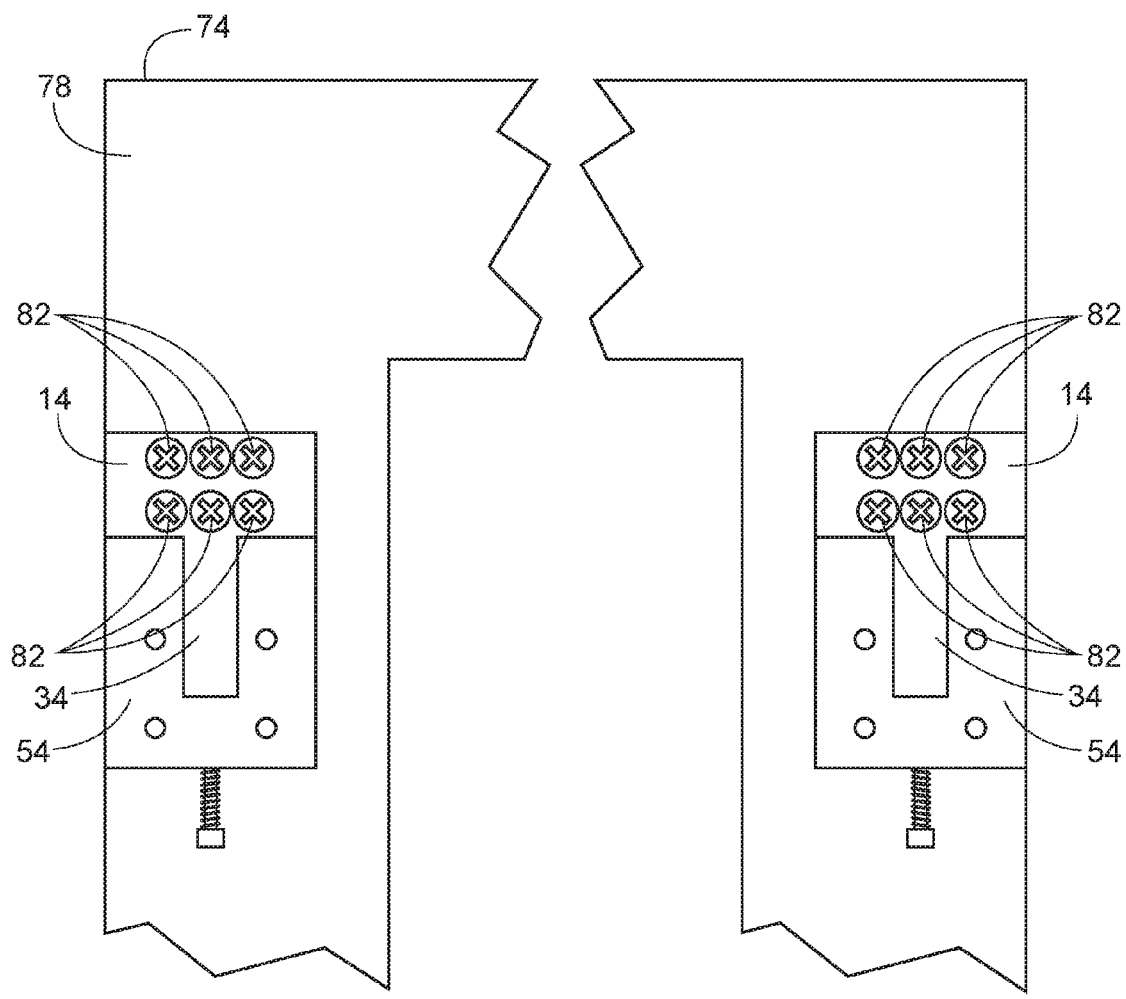
FIG. 13 is a rear view of a frame with the wall hanging apparatus attached to the frame with a sheet of adhesive attached to the lower halves.
Figure 14:
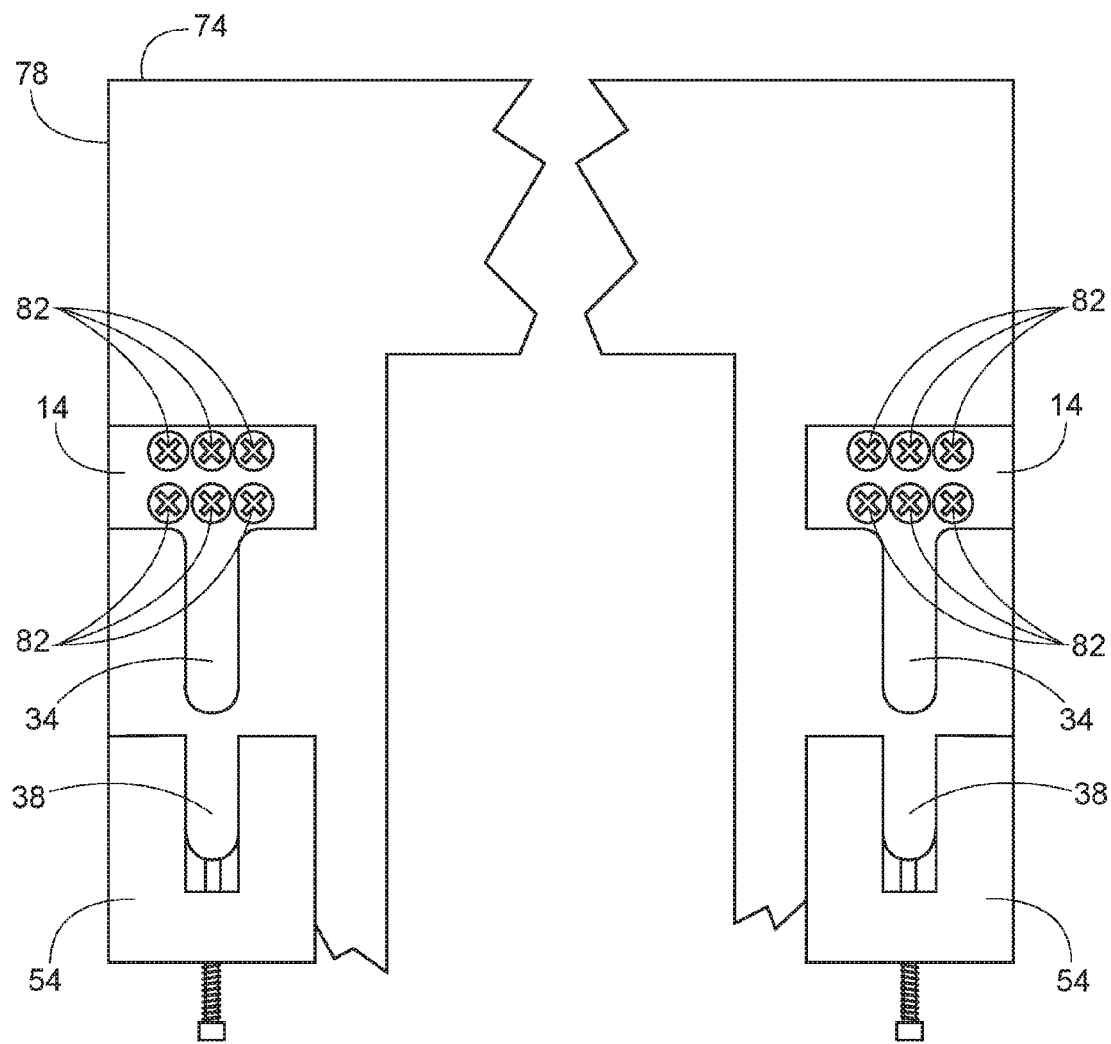
FIG. 14 is a rear view of a frame with the upper halves attached to the frame, and the upper halves separated from the lower halves, with a sheet of adhesive attached to the lower halves.

FIG. 13 shows the wall hanging apparatus of FIG. 11, but with the adhesive sheet 54 visible. FIG. 14 shows the wall hanging apparatus of FIG. 12, but with the adhesive sheet 54 visible.

Figure 15:
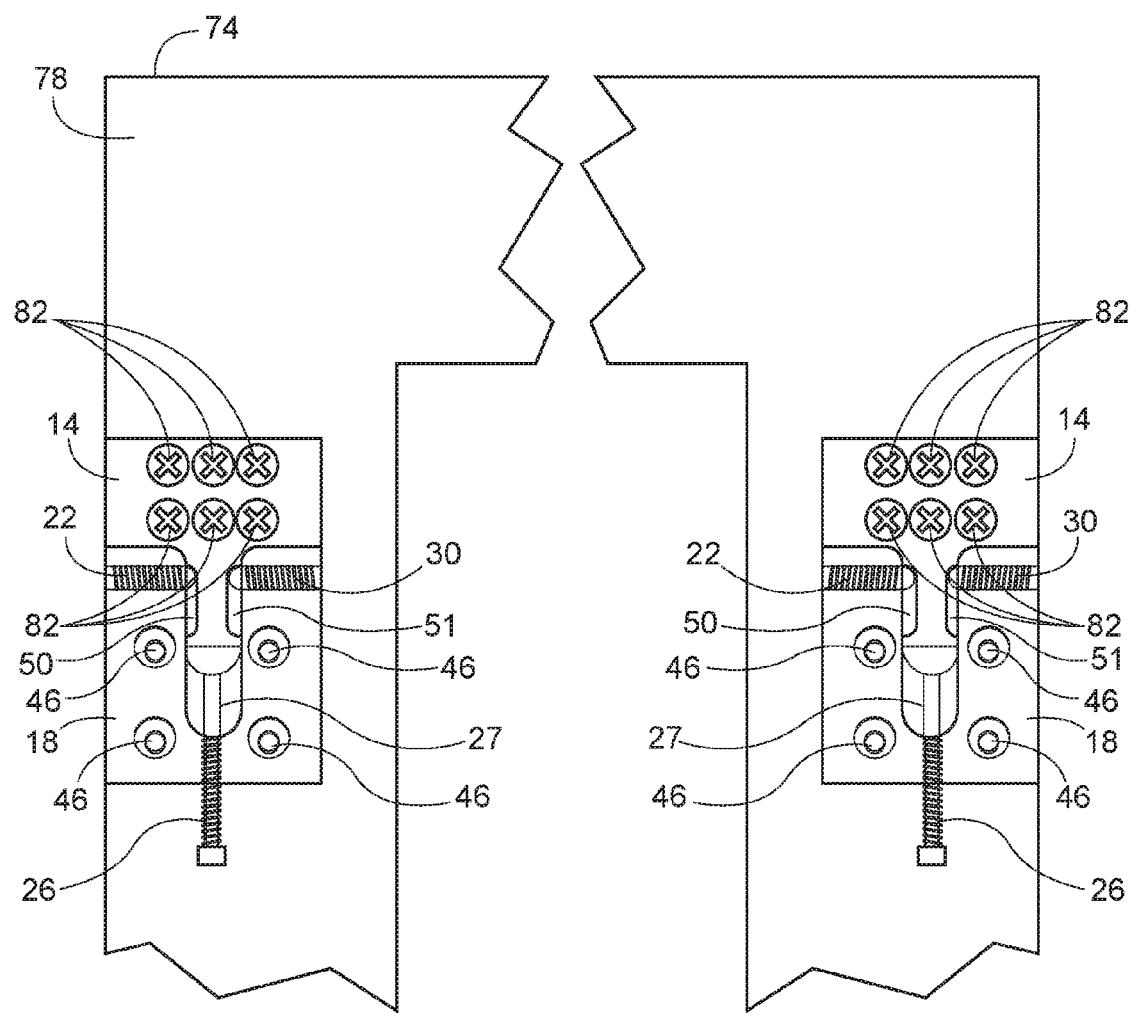
FIG. 15 is a rear view of a frame from FIG. 11, but with the upper and lower halves being transparent.

FIG. 15 is a view of the wall hanging apparatus attached to a frame 74, but with the lower half 18 being transparent.

In FIG. 15, the adhesive sheet 54 is not shown, and the first set screws 22, second set screws 26, and third set screws 30 are all shown generally screwed in generally completely into the set screw holes 23, 27, 31 respectively until the set screws 22, 26, 30 impinge upon the upper half 14.

Figure 16:
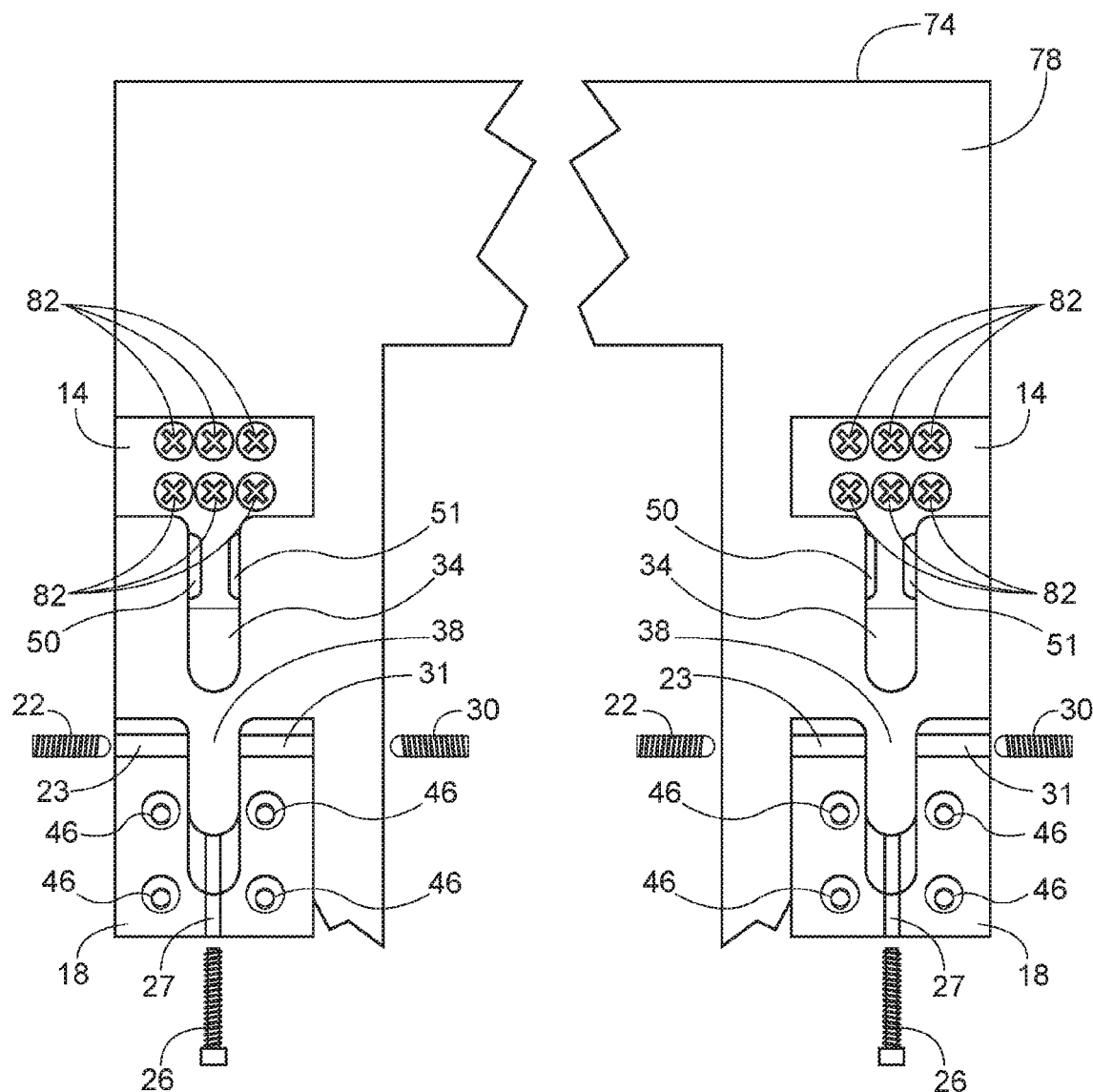
FIG. 16 is the rear view of a frame from FIG. 15, but with the upper halves separated from the lower halves, and the set screws removed from the lower halves.

FIG. 16 shows the wall hanging apparatus of FIG. 15, with the frame 74 and upper half 14 slide up and away from the lower half 18. In addition, all the set screws 22, 26, 30 are shown removed from the lower half 18.

Figure 17:
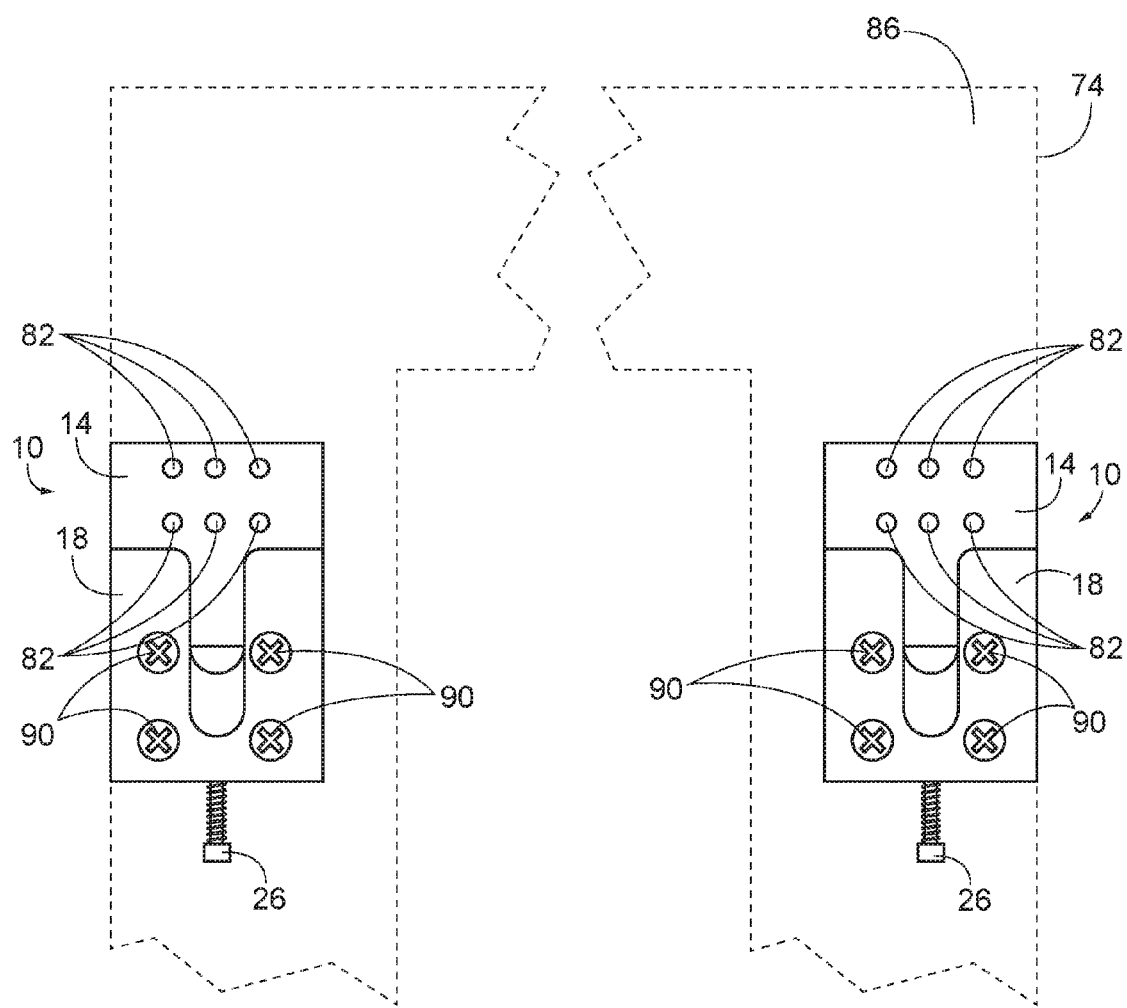
FIG. 17 is a front view of a frame with the wall hanging apparatus attached to the rear of the frame, and the frame being transparent.

FIG. 17 shows a view of the front 86 of the frame 74. The frame 74 is depicted as transparent so the wall hanging apparatus 10 can be seen. In this view, the upper halves 14 are attached to the rear 78 of the frame 74 via upper half screws 82. The lower halves 18 are attached to a wall or other surface via lower half screws 90.

Figure 18:
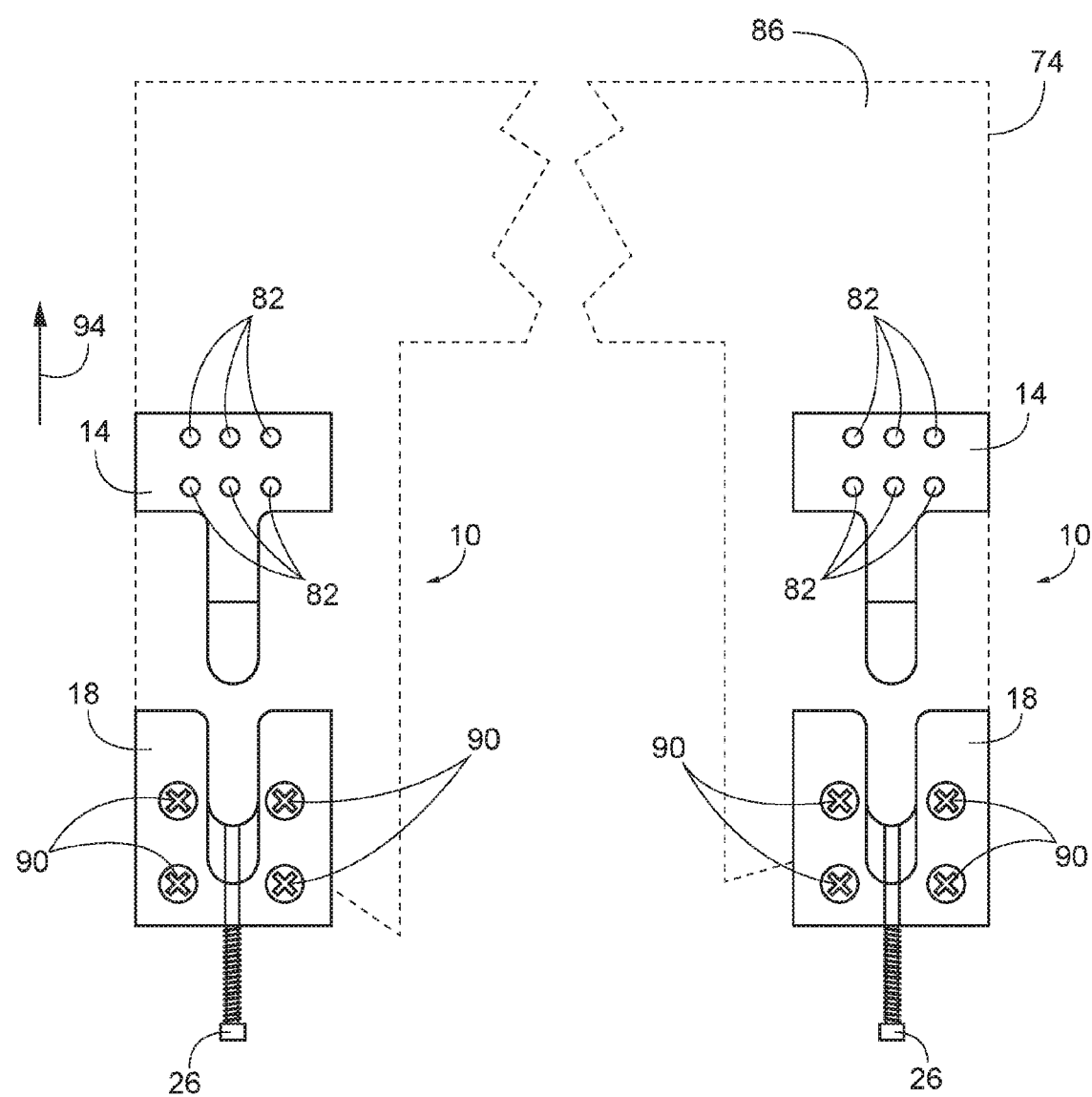
FIG. 18 is the front view of the frame from FIG. 17, with the upper halves separated from the lower halves.

FIG. 18 shows a view of the front 86 of the frame 74, similar to FIG. 17, except in this figure the frame 74 and upper halves 14 have been slid up in the direction of the arrow 94 with respect to the lower halves 18 which are attached to the wall via the lower half screws 90.

Figure 19:
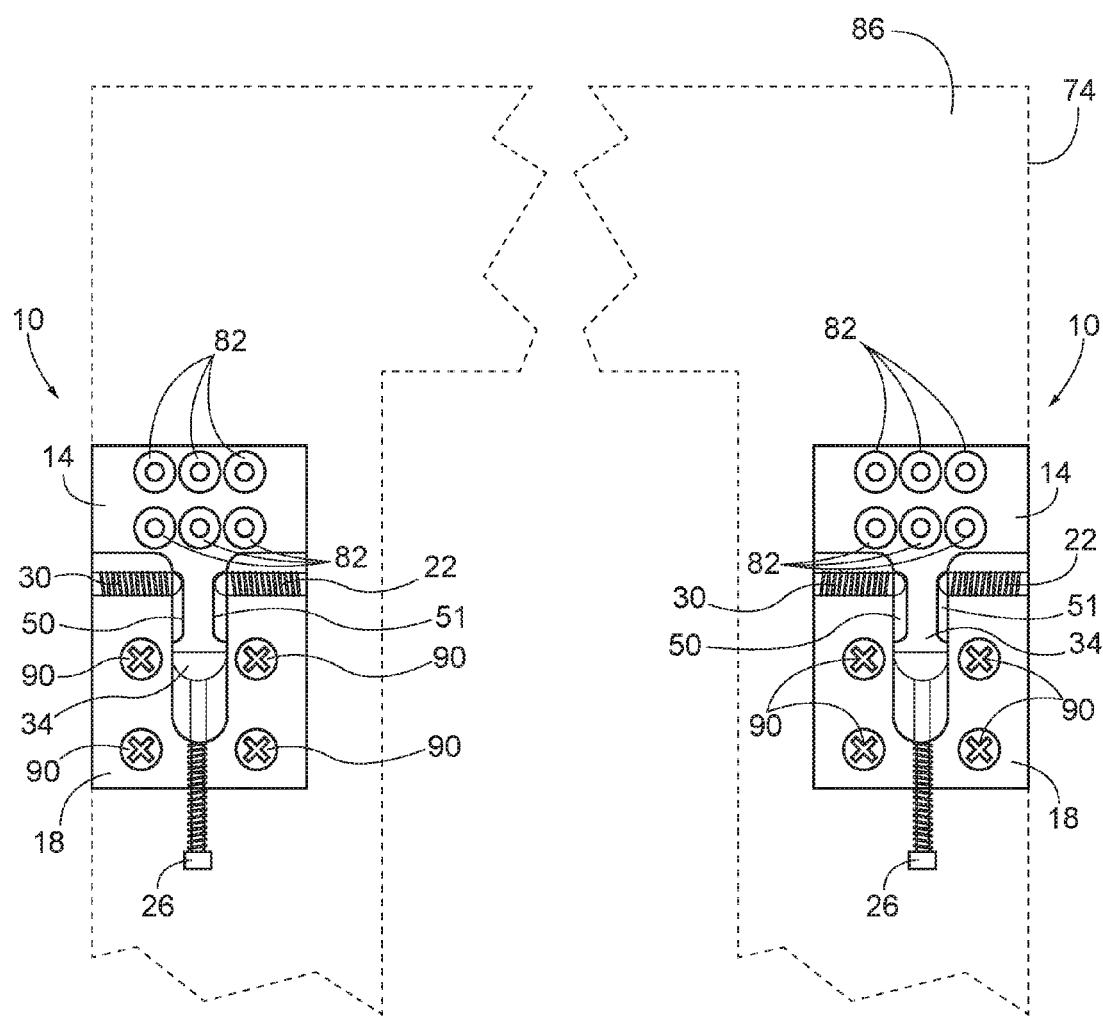
FIG. 19 is a front view of a frame from FIG. 17, but with the upper and lower halves being transparent.

FIG. 19 shows the wall hanging apparatus of FIG. 17, however in this view the upper halves 14 and lower halves are also transparent, as well as the frame 74.

Figure 20:
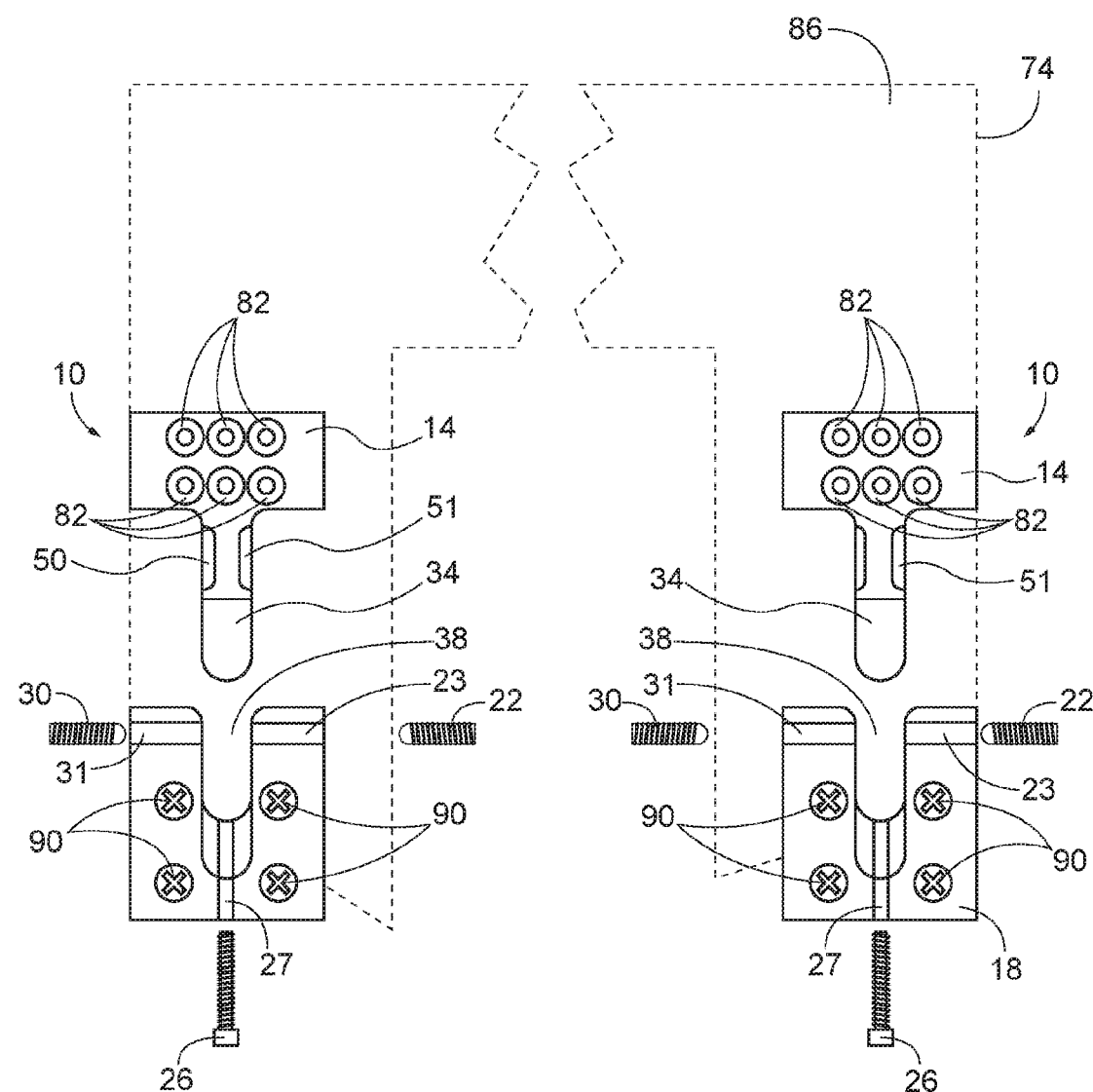
FIG. 20 is a front view of a frame from FIG. 19, but with the upper halves separated from the lower halves, and the set screws removed from the lower halves.

FIG. 20 shows the wall hanging apparatus of FIG. 18, however in this view the upper halves 14 and lower halves are also transparent, as well as the frame 74. In addition, in FIG. 20, the set screws 22, 26, 30 have all been removed from their respective holes 23, 27, 31.

Figure 21:
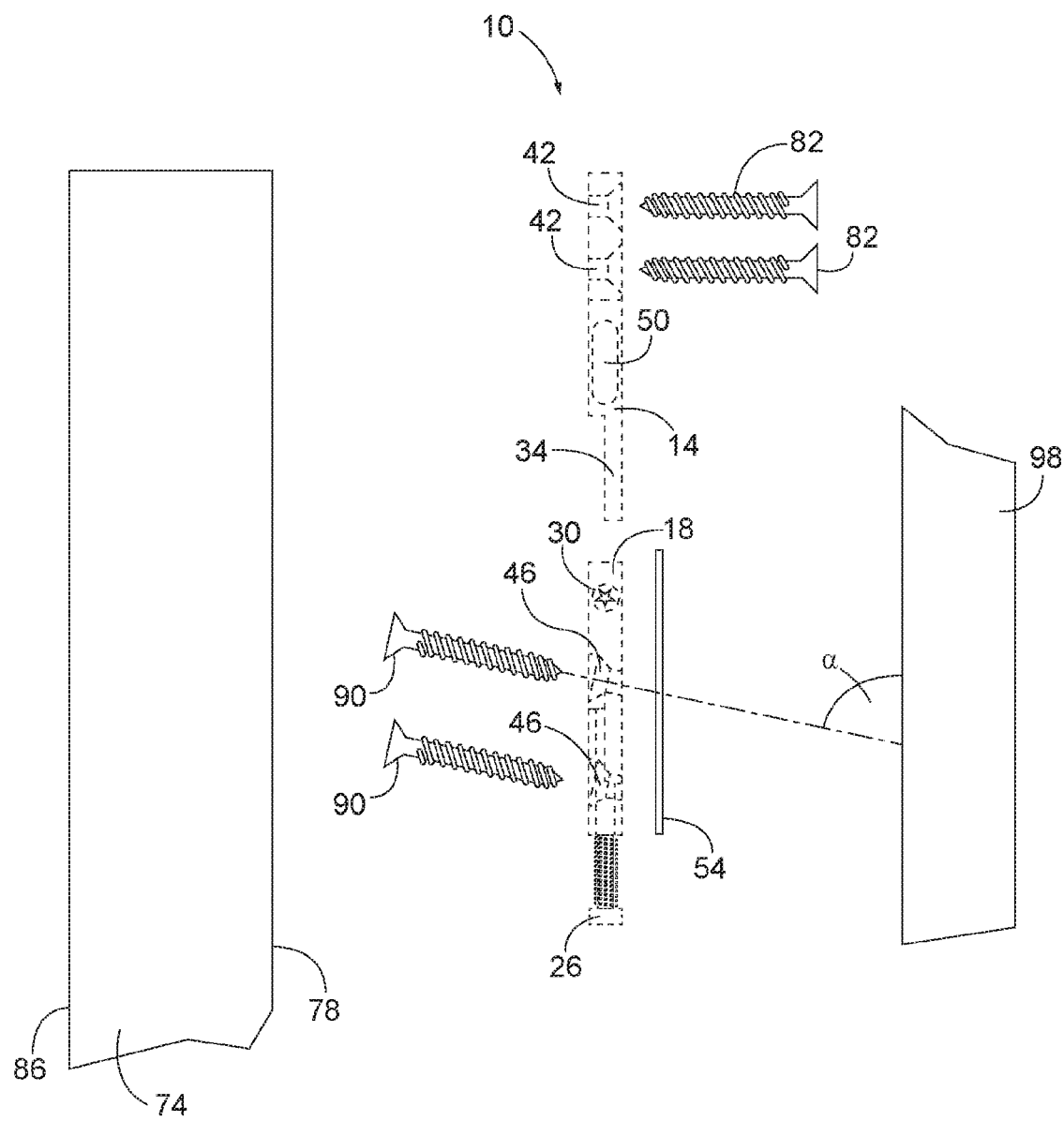
FIG. 21 is a side view of the wall hanging apparatus prior to installation.

FIG. 21 is a side view of the wall hanging apparatus 10 prior to being installed on the frame 74 or wall 98. In this embodiment, the lower half screw holes 46 may be at an angle α with respect to the wall. In one embodiment α may be about 79°.

Figure 22:
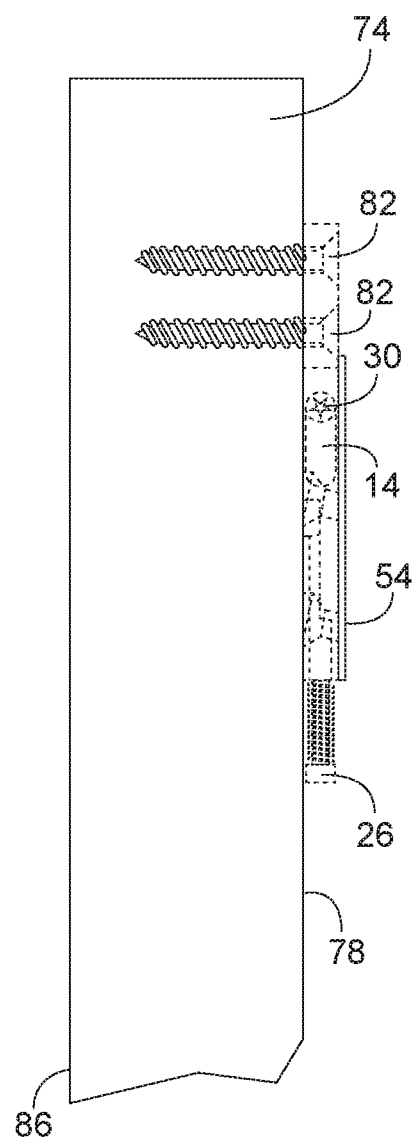
FIG. 22 is a side view of a frame with the upper half attached to the frame.

FIG. 22 is a side view of the upper half 14 attached to a frame 74.

Figure 23:
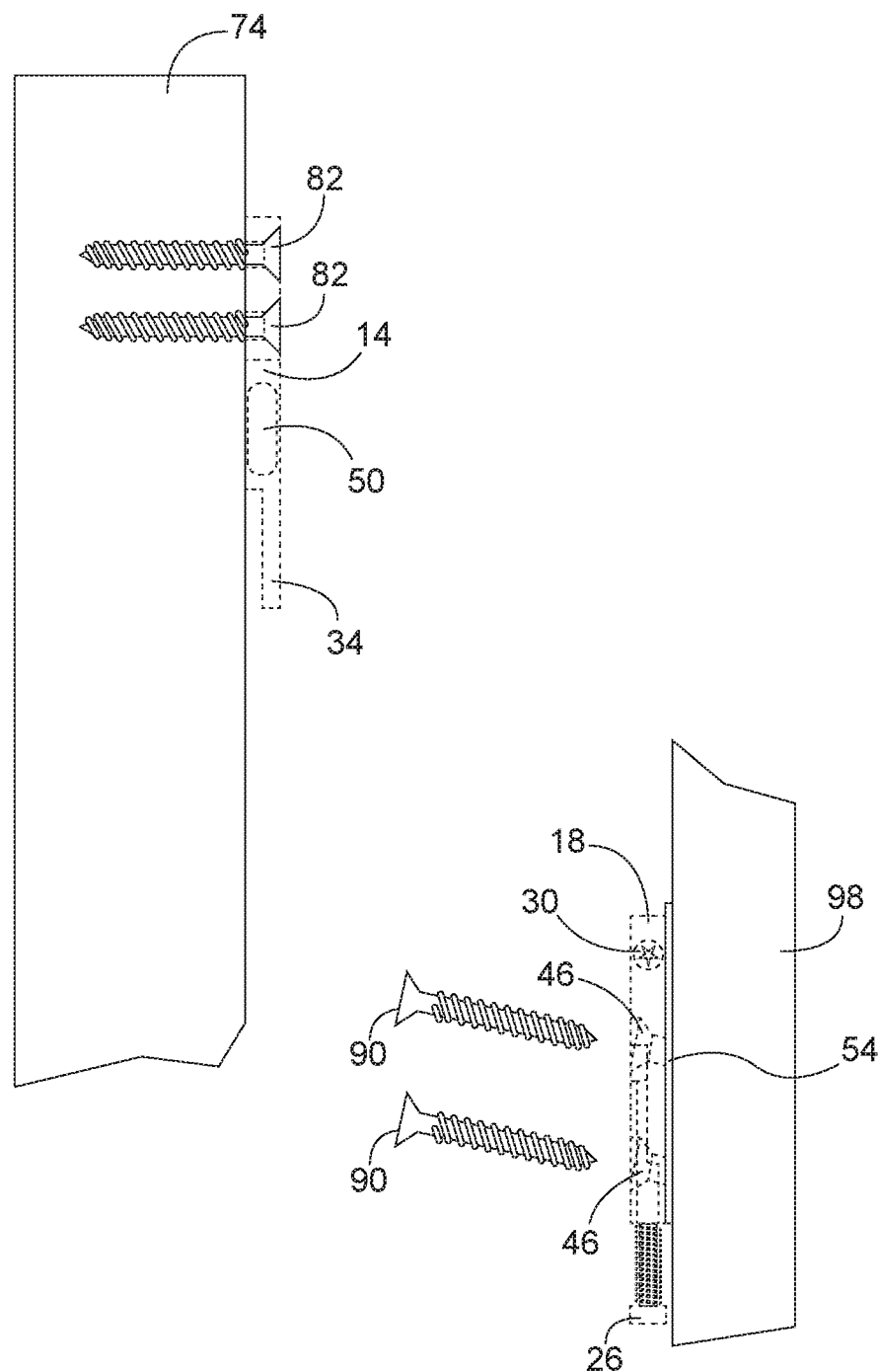
FIG. 23 is side view of a frame with the upper half attached to the frame, and a side view of a wall, with the lower half adhered to the wall.

FIG. 23 is a side view of the lower half 18 attached to a wall 98 via the adhesive sheet 54, with the frame 74 and upper half 14 having been slid up and away from the lower half 18. The lower half screws 90 have not yet been screwed through the lower half 18 into the wall 98.

Figure 24:
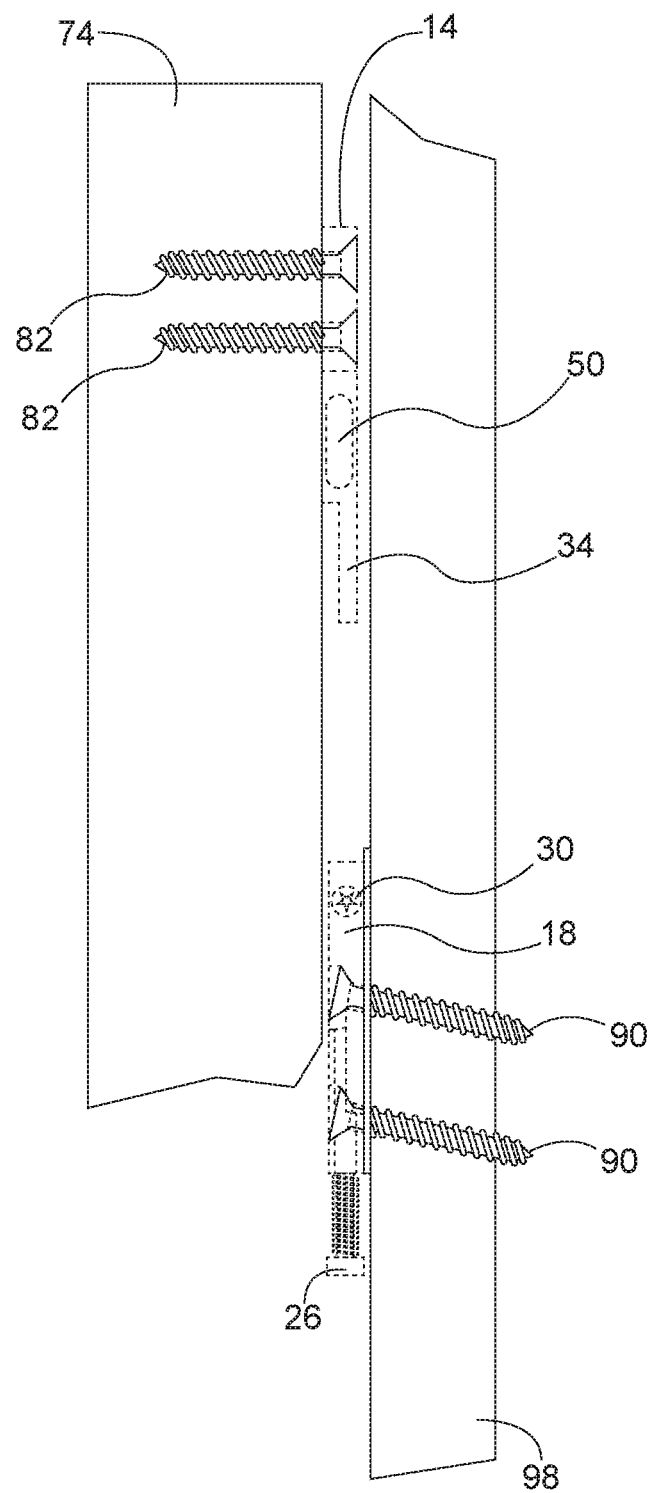
FIG. 24 is a side view of the wall, with the lower half attached to the wall, and the frame and upper half slide up and away from the lower half.

FIG. 24 is a side view of the lower half 18 attached to the wall 98 via the lower half screws 90, and the frame 74 and upper half 14 about to be slid down, with the upper half 14 about to mate with the lower half 18.

Figure 25:
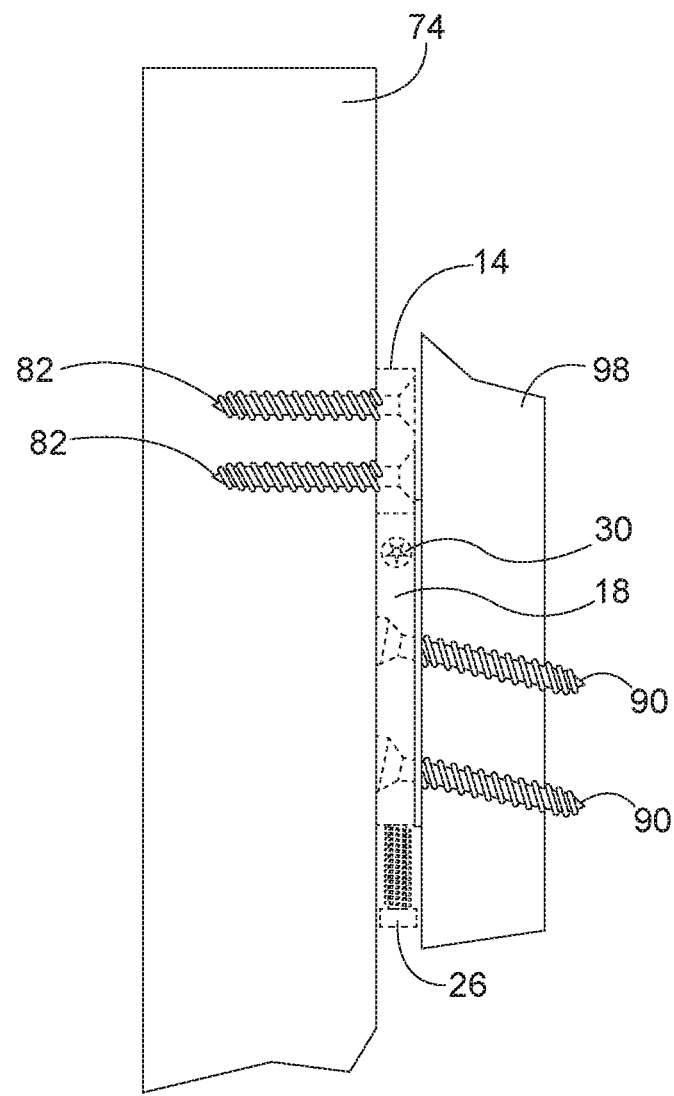
FIG. 25 is a side view of a frame and wall, with the frame hanging from the wall using the wall hanging apparatus.

FIG. 25 shows the frame 74 attached to the wall 98 using the wall hanging apparatus 10, with the upper half 14 engaged with the lower half 18.

Figure 26:
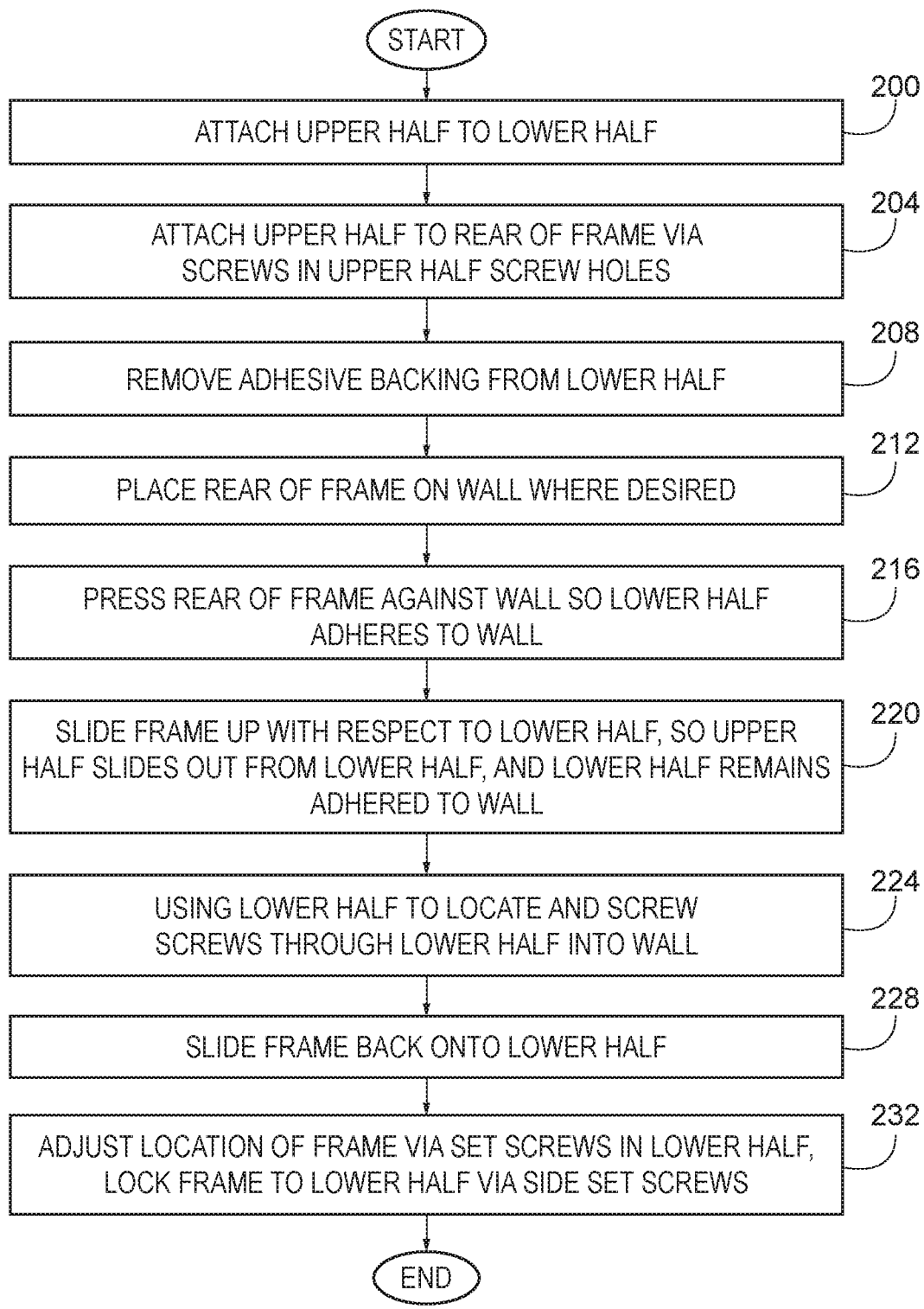
FIG. 26 is a flowchart showing a method of the invention.

FIG. 26 shows a flowchart describing a method of using the disclosed wall hanging apparatus. At act 200, one attaches the upper half to the lower half. At act 204, one attaches the upper half to the rear of a frame using upper half screws. At act 208 the user removes the adhesive backing from the adhesive sheet on the lower half. At act 212 the user places the rear of the frame on a wall or other surface where the user desires. At act 216 the user presses the rear of the frame against the wall, such that the lower half will adhere to the wall due to the adhesive sheet. At act 220, the user slides the frame and upper half up with respect to the lower half, so that the upper half slides up and out of the lower half and disengages from the lower half. The lower half will remain attached to the wall due to the adhesive sheet. At act 224, the user uses the lower half to locate the location of the lower half screws, and fastens the screws to the lower half and to the wall. At act 228, the user slides the frame down towards the lower half such the upper half will slide into the lower half. At act 232 the user makes fine adjustments to the frame by using the set screws in the lower half. In addition the user can use the side set screws 22, 30 and grooves 50 to lock the lower half 18 to the upper half 14.

Figure 27:
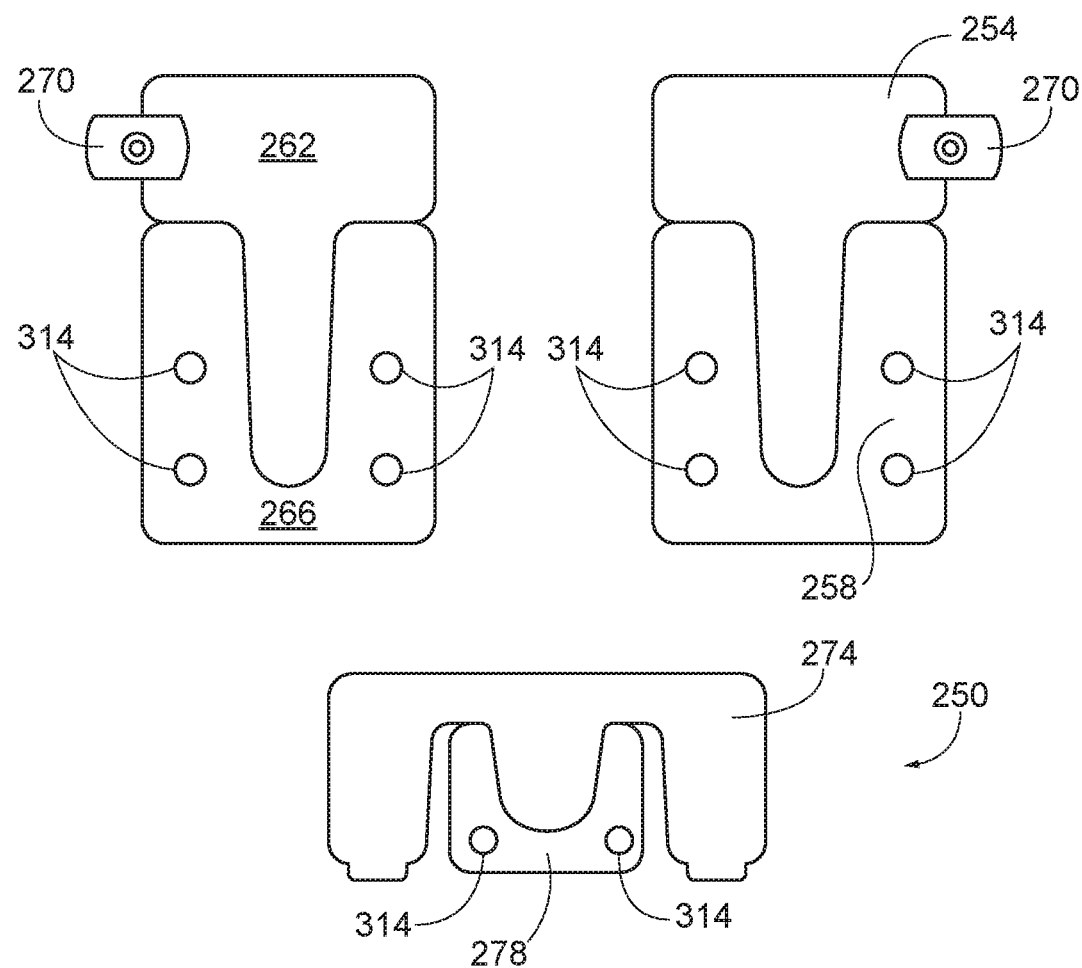
FIG. 27 is front view of another embodiment of the wall hanging apparatus.

FIG. 27 shows another embodiment of the wall hanging apparatus 250. This apparatus may be used for hanging metal frames or other metal objects, where the frame has a groove on the back side of the frame. This apparatus 250 may comprise a side frame first upper half 254, a side frame first lower half 258. There may also be a side frame second upper half 262, and a side frame second lower half 266. The upper halves 254, 262 may be generally mirror images of each other. The side frame first upper half 254 and side frame second upper half 262 both have a groove attachment member 270. There may also be a bottom frame upper half 274, and a bottom frame lower half 278. The lowers halves 258, 266, 278 will all each have at least one screw hole 314 configured to attach the lower halves 258, 266, 278 similar to described as above for other embodiments.

Figure 28:
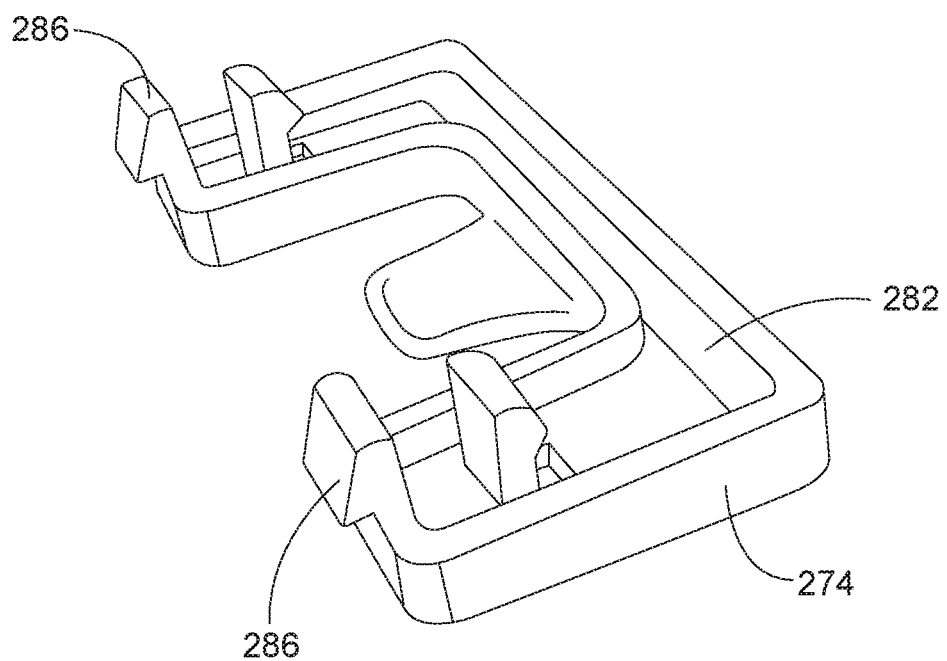
FIG. 28 is a rear perspective view of the bottom upper half.

FIG. 28 shows a rear perspective view of the bottom frame upper half 274. On the rear side 282 of the bottom frame upper half 274 are at least one groove attachment member 286, in this embodiment there are two groove attachment members 286.

Figure 29:
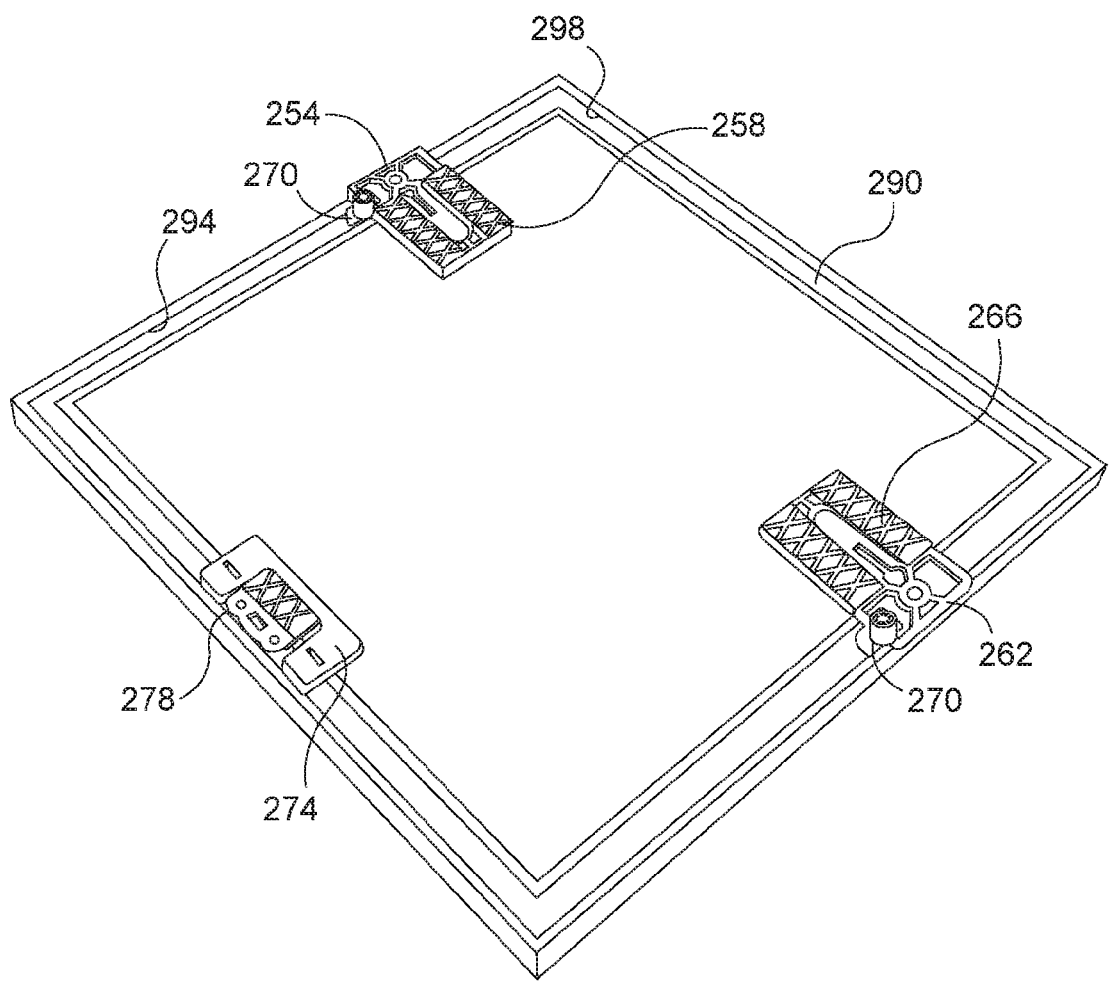
FIG. 29 is a rear perspective view of the rear of a metal frame with the wall hanging apparatus attached to the frame.

FIG. 29 shows a metal frame 290 with a groove 294 on the rear side 298 of the frame 290. The side frame upper halves 254, 262 are attached to the groove 294 via the groove attachment member 270. The bottom frame upper half 274 is also attached to the groove 294 via the groove attachment members 286.

Figure 30:
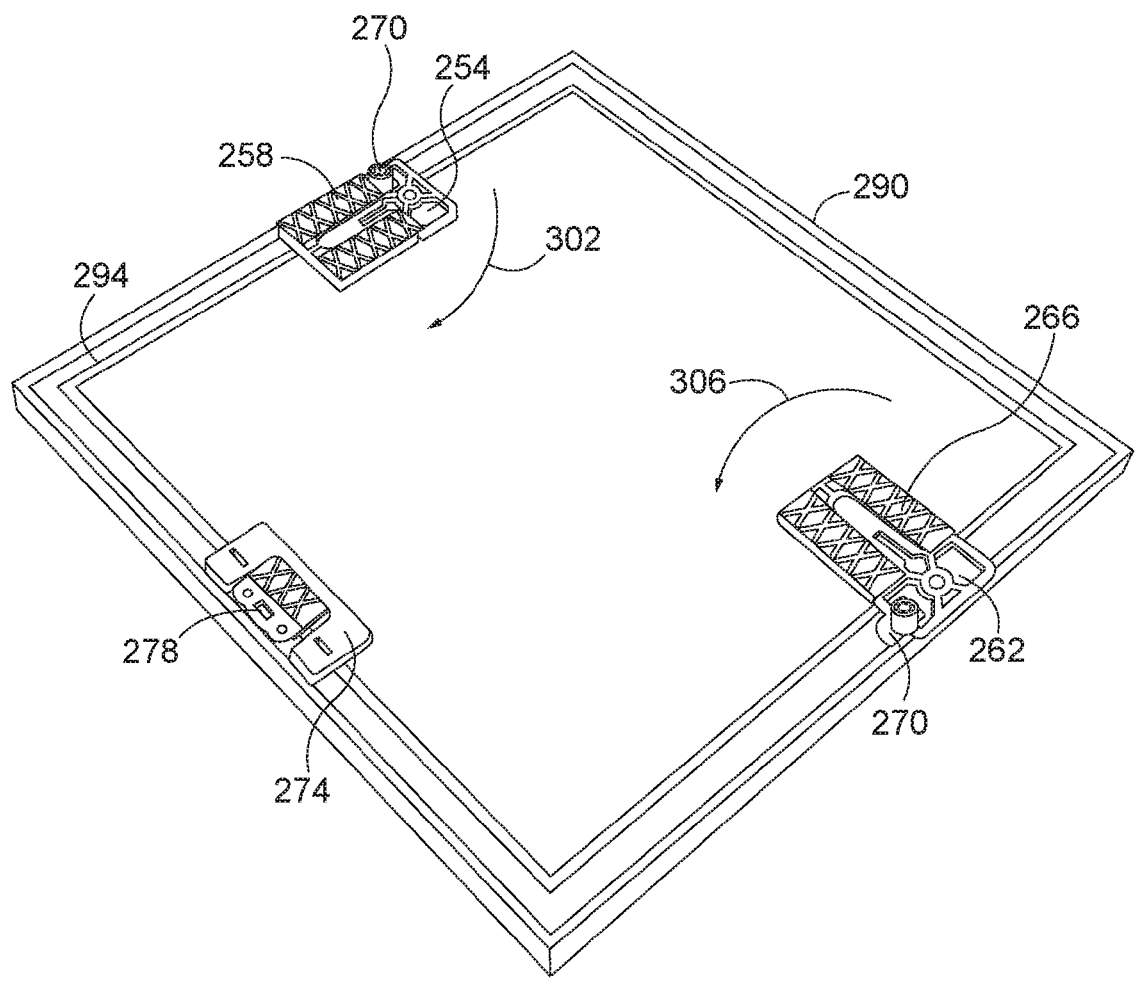
FIG. 30 is a rear perspective view of the rear of a metal frame, with one of the upper halves rotated about 90°.

FIG. 30 shows the system from FIG. 29, but now the side frame upper half 254 and lower half 258 have been rotated about 90° clockwise in the direction of the arrow 302 about the groove attachment member 270. Similarly, the upper half 262 should be rotated counter-clockwise in the direction of the arrow 306.

Figure 31:
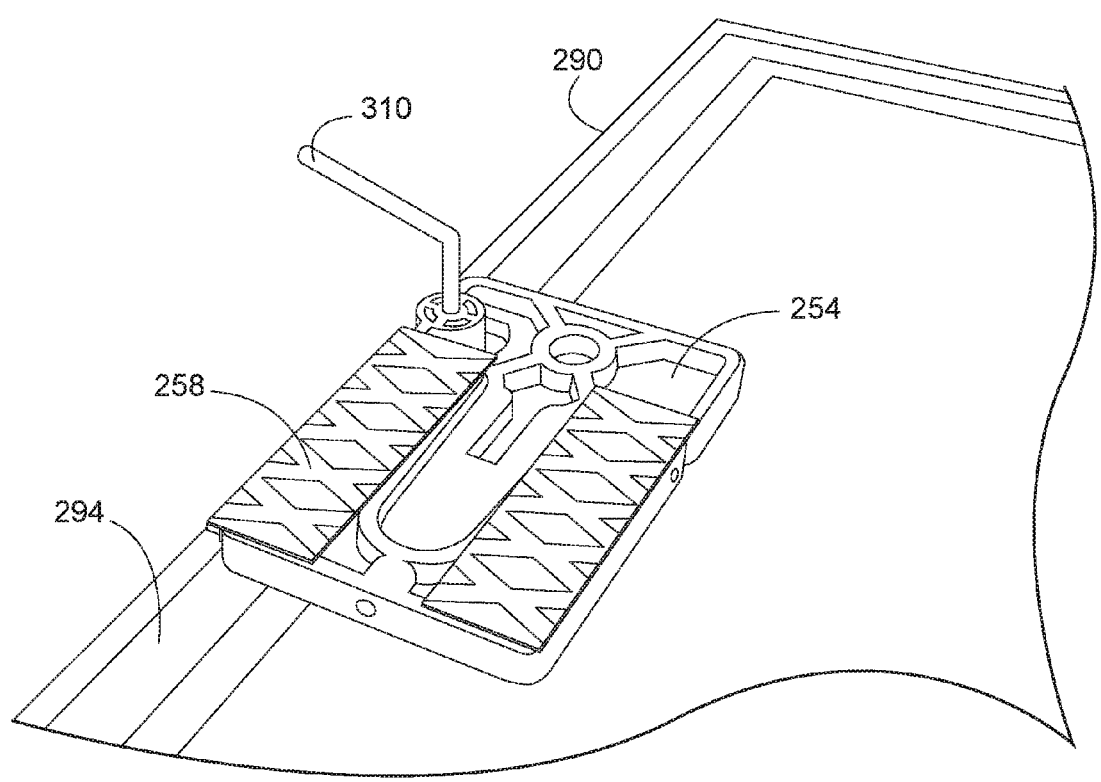
FIG. 31 is a close up view of a side upper half and a side lower half being attached to the rear of a metal frame.

FIG. 31 shows that the upper half 254 is being locked in place by using an allen wrench 310 to turn a set screw to lock the upper half 254 to the groove 294 after the upper half 254 has been rotated about 90°. The set screw is not visible in this view, but there is a set screw that is being tightened. When tightened this set screw holds the two halves of the device together so as to prevent them from being removed from the wall. This is what prevents casual theft of the frame. The other upper half 262 can be similarly locked to the groove 294 via using an allen wrench 310. The bottom frame upper half 274 locks in to the groove simply by the shape of the groove attachment members 286, and no rotation is necessary or desired for the bottom frame upper half 274.

The disclosed wall hanging apparatus may be employed by first aligning the outer edges of the devices with the outer edges of the frame. Although each device may be affixed to the respective side of a frame at a similar distance from the top of the frame this wall hanging apparatus does not require that the distances be precisely identical. The upper halves of the devices may then be affixed to the frame by screws through holes drilled in the upper halves. The lower halves of the devices may remain adhered to the upper halves by the overlap of the adhesive strips. The screws may be placed in the holes drilled in the upper halves and then tightened into the frame until the heads of the screws are flush with sides of the devices. Once the devices are affixed to the frame, the installer may then remove the adhesive backing from the adhesives strips on the lower halves of the devices exposing the adhesive layer facing the wall side of the frame. The installer then places a level on the frame so the installer may determine horizontal or vertical level. With the level on the frame and the adhesive exposed on the wall side of the lower halves of the devices, the installer then locates that frame on the desired location on a wall with the proper horizontal alignment achieved by referring to the level. When the desired location with proper alignment is found, the installer then firmly presses the frame against the wall and the adhesive then holds the lower halves of the devices in the selected place on the wall. The installer then raises the frame vertically separating the upper halves of the devices from the lower halves, with the lower halves remaining on the wall held by the adhesive. The installer can then place the frame aside with the upper halves of the devices affixed to it. The installer then permanently attaches the lower halves of the devices into the wall at the locations where they are held by the adhesive by placing screws through the holes drilled in the lower halves of the devices and installing the screws until the screws are flush with the edge of the device. The lower halves of the devices may be drilled so that the screws are directed into the wall at an about 11° downward angle. The screws are tightened into the walls (and through the adhesive strips) until the heads of the screws do not protrude past the edge of the devices. Once the lower halves of the devices are permanently attached to the wall then the frame is returned to the wall with the male parts of the upper halves of the devices placed into the female parts of the lower halves. Note that the set screws in the lower halves of the devices generally do not extend into the female part of the lower halves until all adjustments are accomplished as an improperly extended set screw could prevent the complete nesting of the lower and upper halves of the devices. Once a frame is hanging on the wall with the upper and lower halves of the devices nested together, the devices are designed to permit minor but significant adjustments to allow a more precise vertical location on the wall and a more squared alignment. This is accomplished by use of set screws in the bottom and side of the lower halves of the devices and the grooves in the sides of the male part of the upper halves that align with the side set screws of the lower halves. To raise an entire frame, an installer adjusts the set screws in the bottoms of both lower halves of the devices an equal distance. To adjust the alignment of a frame, an installer adjusts the set screw in the bottom of the lower half of the device for the side that needs to be raised to achieve horizontal alignment. Once the height and alignment of a frame is accomplished, the installer then tightens the set screws on the sides of the lower halves of the devices. This holds the adjustment in place because the diameter of the hemispherical end of the set screws may be the same as the diameter as the groove cavities in the male part of the upper halves of the devices. This matching of diameters may achieve a maximum friction between the surface areas of the set screws and grooves. The set screws will then hold a frame at the adjusted height and alignment. When the upper and lower halves of the devices are nested together the vertical load (or weight) of the frame is held by the assembled devices as affixed to the frame and attached to the wall. The manner of the fit of the extended member on the male part of the upper halves of the devices into the receiving slot of the lower halves prevents a frame from moving horizontally away from a wall. That design also prevents rotation along the latitudinal axis of the frame. Because the male parts of the upper halves of the devices have grooves, the male parts generally cannot be lifted out from the female parts of lower halves as the bottom of the grooves will be stopped by the set screws and prevent removal without first loosening the set screws. The set screws may have a unique head (i.e., not a hex or square shape) that can only be turned with a matching wrench or screw driver of the same shape and dimension thus preventing a person without the appropriate tool from loosening the set screws and removing the frame by separating the halves of the devices. If the vertical load or weight of a frame is such that more than two devices are necessary then two or more additional device pairs can be used by affixing one of each pair to each side of a frame and then attaching them to a wall in the same manner as a single pair of devices. This wall hanging apparatus permits the installation of a frame on a wall using the devices and a level that without first making preliminary measurements or marks on a wall to achieve the desired location with proper alignment. The wall hanging apparatus allows minor adjustment to correct any misalignment or mis-location that is too low. Once the alignment and location is accomplished the set screws and grooves secure the frame in place and prevent accidental misalignment or mis-positioning when hit or bumped into. The set screws and grooves prevent the removal of a frame from a wall without use of the appropriate unique tool.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A wall hanging apparatus comprising:
    an upper half; the upper half comprising:
        a frame attachment portion;
        an extended member extending down from the frame attachment portion;
        at least one screw hole located in the frame attachment portion and configured to allow a screw to attach the upper half to a frame;
        a first set screw groove located in a first side of the extended member;
    a lower half, the lower comprising:
        an adhesive sheet on the lower half, the adhesive sheet configured to cause the lower half to adhere to a wall when the lower half is pressed against the wall;
        a receiving slot configured to receive the extended member;
        at least one screw hole located in the lower half and configured to allow a screw to attach the lower half to the wall;
        a first set screw hole located on a first outer side of the lower half, the first set screw hole configured to allow a set screw to screw into the first set screw hole and impinge on the first set screw groove and generally prevent the upper half from sliding out of the lower half when the set screw is screwed into the first set screw groove.

2. The wall hanging apparatus of claim 1, further comprising:
    a second set screw groove located in a second side of the extended member;
    a third set screw hole located on a second outer side of the lower half, the third set screw hole configured to allow the set screw to screw into the third set screw hole and impinge on the second set screw groove and generally prevent the upper half from sliding out of the lower half when the set screw is screwed into the first set screw groove.

3. The wall hanging apparatus of claim 1, further comprising:
    a second set screw hole located on a bottom side of the lower half, the second set screw hole configured to allow a set screw to screw into the second set screw hole and impinge on the extended member and can cause the upper half to move relative to the lower half.

4. The wall hanging apparatus of claim 1, wherein the set screw configured to screw into the first set screw hole has a generally hemispherical end configured to mate with the first set screw groove.

5. The wall hanging apparatus of claim 1, wherein the adhesive sheet has a removeable backing.

6. The wall hanging apparatus of claim 1, further comprising:
    a bottom frame upper half; the upper half comprising:
        a frame attachment portion;
        a groove attachment member attached to one side of the frame attachment portion, the groove attachment member configured to attach to a groove on the rear side of a frame;
        an extended member extending down from the frame attachment portion;
        the first set screw groove located in a first side of the extended member;
    a bottom frame lower half, the lower comprising:
        an adhesive sheet on the lower half, the adhesive sheet configured to cause the lower half to adhere to the wall when the lower half is pressed against the wall;
        a receiving slot configured to receive the extended member;
        at least one screw hole located in the lower half and configured to allow a screw to attach the bottom frame lower half to the wall;
        a first set screw hole located on a first outer side of bottom frame the lower half, the first set screw hole configured to allow a set screw to screw into the first set screw hole and impinge on the first set screw groove and generally prevent the bottom frame upper half from sliding out of the bottom frame lower half when a set screw is screwed into the first set screw groove; and
    a groove attachment member attached to the frame attachment portion of the upper half.

7. A wall hanging system comprising:
    a frame configured to display an item;
    a first upper half configured to attach to a rear surface of the frame, the first upper half comprising:
        a frame attachment portion;
        an extended member extending down from the frame attachment portion;

at least one screw hole located in the frame attachment portion and configured to allow a screw to attach the first upper half to the frame;
a first set screw groove located in a first side of the extended member;
a first lower half configured to attach to the wall, the lower comprising:
an adhesive sheet on the first lower half, the adhesive sheet configured to adhere to the wall when the first lower half is pressed against the wall;
a receiving slot configured to receive the extended member;
at least one screw hole located in the lower half and configured to allow a screw to attach the second lower half to the wall;
a first set screw hole located on a first outer side of the second lower half, the first set screw hole configured to allow a set screw to screw into the first set screw hole and impinge on the first set screw groove and generally prevent the second upper half from sliding out of the second lower half when a set screw is screwed into the first set screw groove.

8. The wall hanging system of claim 7, further comprising:
a second set screw groove located in a second side of the extended member;
a third set screw hole located on a second outer side of the lower half, the third set screw hole configured to allow a set screw to screw into the third set screw hole and impinge on the second set screw groove and generally prevent the upper half from sliding out of the lower half when a set screw is screwed into the first set screw groove.

9. The wall hanging system of claim 7, further comprising:
a second set screw hole located on a bottom side of the lower half, the second set screw hole configured to allow a set screw to screw into the second set screw hole and impinge on the extended member and can cause the upper half to move relative to the lower half.

10. The hanging system of claim 7, further comprising:
a second upper half configured to attach to a rear surface of the frame, the second upper half comprising:
a frame attachment portion;
an extended member extending down from the frame attachment portion;
at least one screw hole located in the frame attachment portion and configured to allow a screw to attach the second upper half to the frame;
a first set screw groove located in a first side of the extended member;
a second lower half configured to attach to the wall, the second lower half comprising:
an adhesive sheet on the second lower half, the adhesive sheet configured to cause the second lower half to adhere to the wall when the second lower half is pressed against the wall
a receiving slot configured to receive the extended member;
at least one screw hole located in the lower half and configured to allow the screw to attach the lower half to the wall;
a first set screw hole located on a first outer side of the second lower half, the first set screw hole configured to allow a set screw to screw into the first set screw hole and impinge on the first set screw groove and generally prevent the second upper half from sliding out of the second lower half when a set screw is screwed into the first set screw groove.

11. A method of hanging a frame on a wall, the method comprising:
attaching an upper half to a lower half;
attaching the upper half to a rear of the frame;
removing adhesive backing from the lower half;
placing rear of frame on wall where desired;
pressing rear of frame against the wall so the lower half adheres to wall;
sliding frame up with respect to lower half so upper half slides out from lower half, and lower half remains adhered to wall;
fastening with fasteners the lower half to wall at location where lower half is adhered to wall;
sliding frame back onto lower half;
adjusting location of frame via set screw in the bottom side of the lower half, and locking the upper half to the lower half via the set screw in the first outer side of the lower half and via a set screw in second outer side of the lower half.

12. A wall hanging system comprising:
a frame configured to display an item, the frame comprising a groove on the rear side of the frame;
a first upper half configured to attach to a rear surface of the frame, the first upper half comprising:
a frame attachment portion;
a groove attachment member attached to the frame attachment portion;
an extended member extending down from the frame attachment portion;
at least one screw hole located in the frame attachment portion and configured to allow a screw to attach the first upper half to the frame;
a first set screw groove located in a first side of the extended member;
a wall;
a first lower half configured to attach to the wall, the lower comprising:
an adhesive sheet on the first lower half, the adhesive sheet configured to adhere to the wall when the first lower half is pressed against the wall;
a receiving slot configured to receive the extended member;
at least one screw hole located in the lower half and configured to allow a screw to attach the second lower half to the wall;
a first set screw hole located on a first outer side of the second lower half, the first set screw hole configured to allow a set screw to screw into the first set screw hole and impinge on the first set screw groove and generally prevent the second upper half from sliding out of the second lower half when a set screw is screwed into the first set screw groove;
a bottom frame upper half, the upper half comprising:
a frame attachment portion;
a groove attachment member attached to one side of the frame attachment portion, the groove attachment member configured to attach to the groove;
an extended member extending down from the frame attachment portion;
a first set screw groove located in a first side of the extended member;

a bottom frame lower half, the lower comprising:
  an adhesive sheet on the lower half, the adhesive sheet configured to cause the lower half to adhere to the wall when the lower half is pressed against the wall;
  a receiving slot configured to receive the extended member;
  at least one screw hole located in the lower half and configured to allow the screw to attach the bottom frame lower half to the wall; and
  a first set screw hole located on a first outer side of bottom frame the lower half, the first set screw hole configured to allow a set screw to screw into the first set screw hole and impinge on the first set screw groove and generally prevent the bottom frame upper half from sliding out of the bottom frame lower half when a set screw is screwed into the first set screw groove.

* * * * *